(12) United States Patent
Fukuda

(10) Patent No.: US 6,712,636 B2
(45) Date of Patent: *Mar. 30, 2004

(54) CONNECTOR LOCK MECHANISM

(75) Inventor: Masaru Fukuda, Shizuoka (JP)

(73) Assignee: Yazaki Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/283,998

(22) Filed: Apr. 2, 1999

(65) Prior Publication Data
US 2002/0022394 A1 Feb. 21, 2002

(30) Foreign Application Priority Data
Apr. 8, 1998 (JP) .......................................... 10-096225

(51) Int. Cl.$^7$ ............................................. H01R 13/627
(52) U.S. Cl. ....................................................... 439/353
(58) Field of Search ................................. 439/353, 357, 439/358, 923, 352

(56) References Cited

U.S. PATENT DOCUMENTS

| | | | |
|---|---|---|---|
| 4,392,706 A | | 7/1983 | Baker et al. |
| 4,431,244 A | * | 2/1984 | Anhalt et al. ................ 439/358 |
| 4,655,527 A | | 4/1987 | Vandame |
| 5,203,715 A | * | 4/1993 | Yamamoto .................. 439/354 |
| 5,486,117 A | * | 1/1996 | Chang ......................... 439/357 |
| 5,487,678 A | * | 1/1996 | Tsuji et al. .................. 439/352 |
| 5,769,650 A | * | 6/1998 | Aoyama et al. ............. 439/189 |
| 5,775,930 A | * | 7/1998 | Model et al. ................ 439/352 |
| 5,782,647 A | * | 7/1998 | Okura et al. ................ 439/358 |
| 5,788,527 A | * | 8/1998 | Sanders et al. ............. 439/352 |
| 5,830,002 A | * | 11/1998 | Ito et al. ...................... 439/358 |
| 5,839,915 A | * | 11/1998 | Ford et al. .................. 439/350 |
| 5,876,232 A | * | 3/1999 | Matsushita et al. ......... 439/357 |
| 5,910,027 A | * | 6/1999 | Wayt et al. .................. 439/352 |
| 6,068,507 A | * | 5/2000 | Popa ........................... 439/489 |
| 6,113,416 A | * | 9/2000 | Holzer ........................ 439/357 |
| 6,257,922 B1 | * | 7/2001 | Shinozaki ................... 439/188 |
| 6,341,972 B1 | * | 1/2002 | Odorfer ....................... 439/352 |
| 6,343,948 B1 | * | 2/2002 | Nutzel ........................ 439/358 |

FOREIGN PATENT DOCUMENTS

| | | | |
|---|---|---|---|
| EP | 0 030 768 | 6/1981 | |
| EP | 0 601 522 A2 | 6/1994 | |
| JP | 1-98484 | 6/1989 | ......... H01R/13/639 |
| JP | 9-180820 | 7/1997 | ........... H01R/13/64 |

* cited by examiner

Primary Examiner—Javaid H. Nasri
Assistant Examiner—Thanh-Tam Lee
(74) Attorney, Agent, or Firm—Sughrue Mion, PLLC

(57) ABSTRACT

A connector lock mechanism which not only can reduce the number of parts required in male and female connectors to be engaged with each other and the number of assembling steps of the connectors but also can surely detect a partially engaged condition between the male and female connectors. In a connector lock mechanism (31), there is included a connector removing mechanism (48) which is composed of a flexible elastic piece (35) formed integrally with one connector or male connector (32), and a push-out guide surface (41) formed integrally with the other connector or female connector (33) and capable of deforming the flexible elastic piece (35) elastically to thereby generate a push-out force pushing back the two connectors in their mutually removing directions. And, the elasticity of the flexible elastic piece (35) and the inclination angle of the push-out guide surface (41) are set such that the push-out force to be generated by the connector removing mechanism (48) is larger than mutual contact resistance caused by and between male- and female-type terminals respectively stored within their associated connectors.

5 Claims, 24 Drawing Sheets

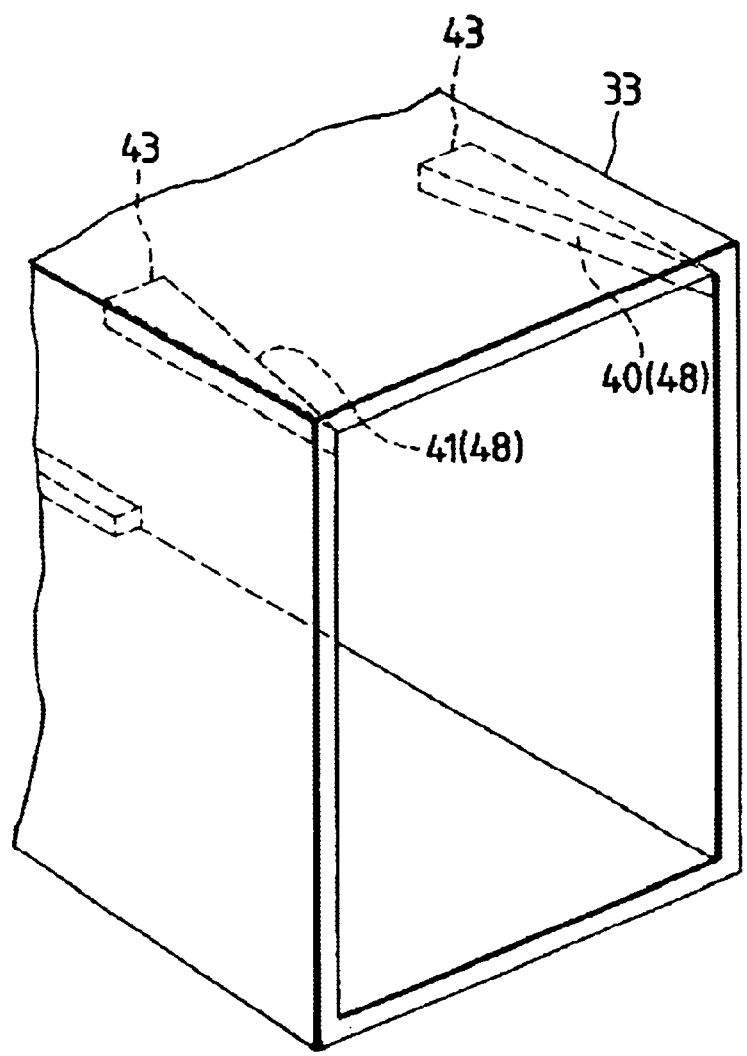

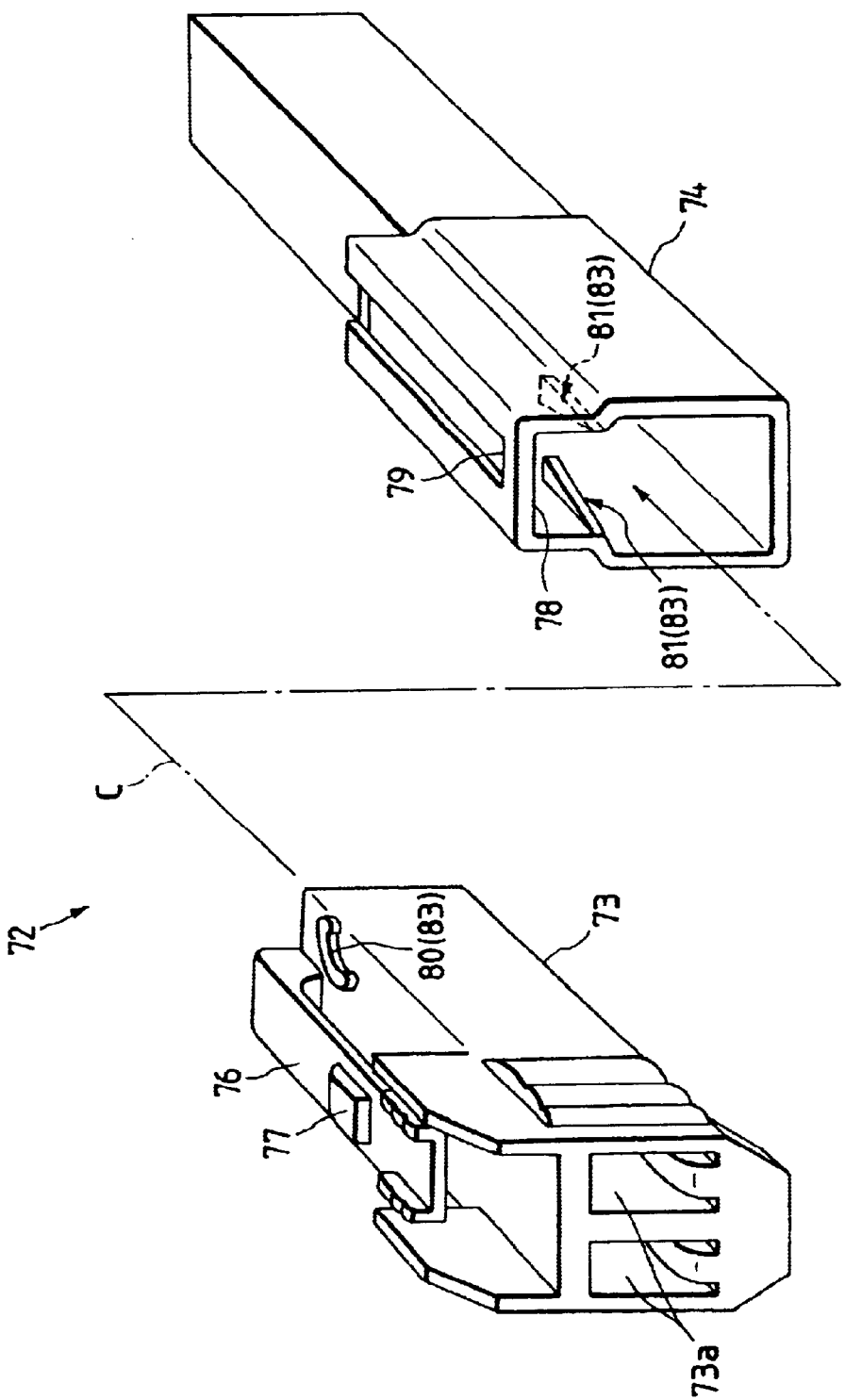

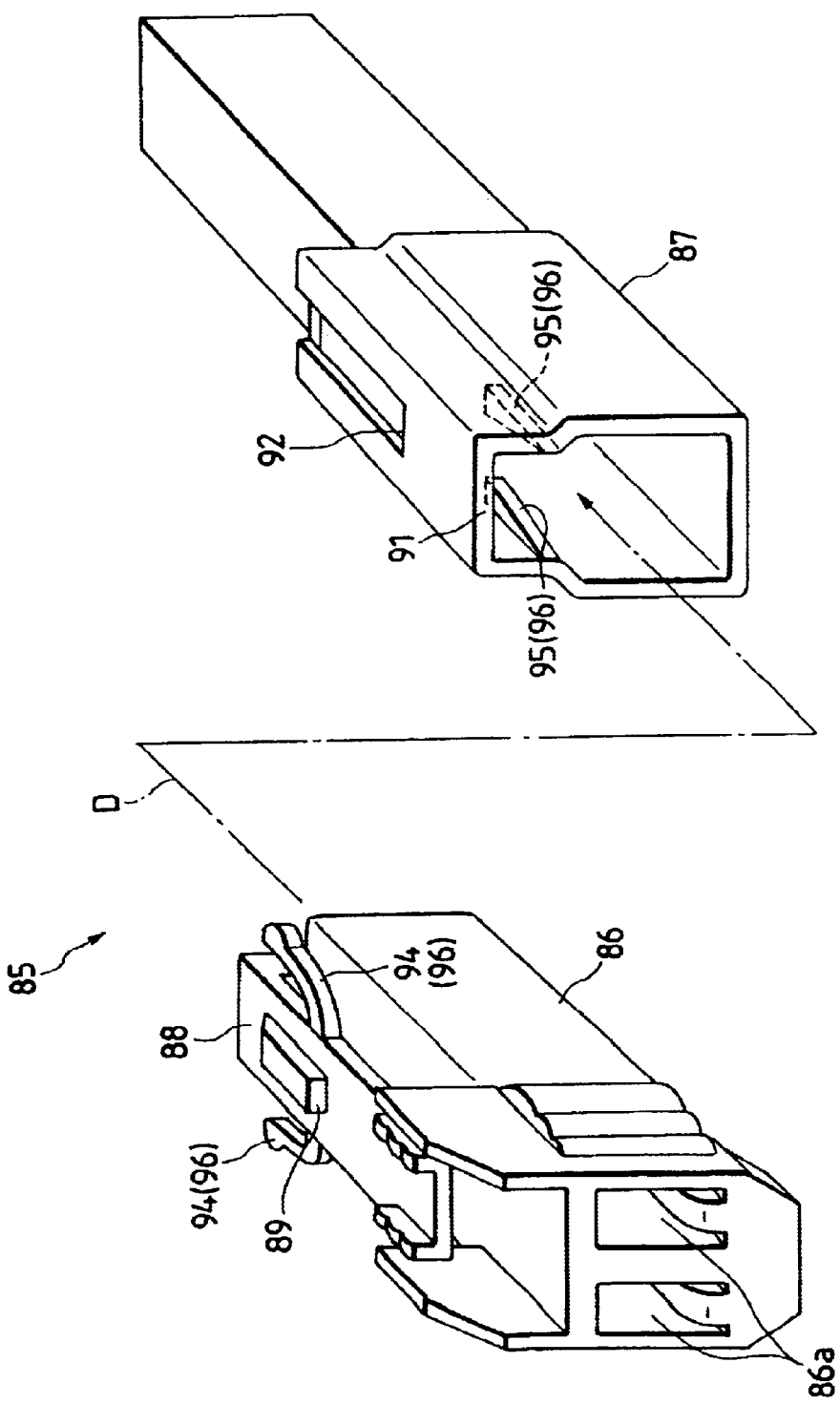

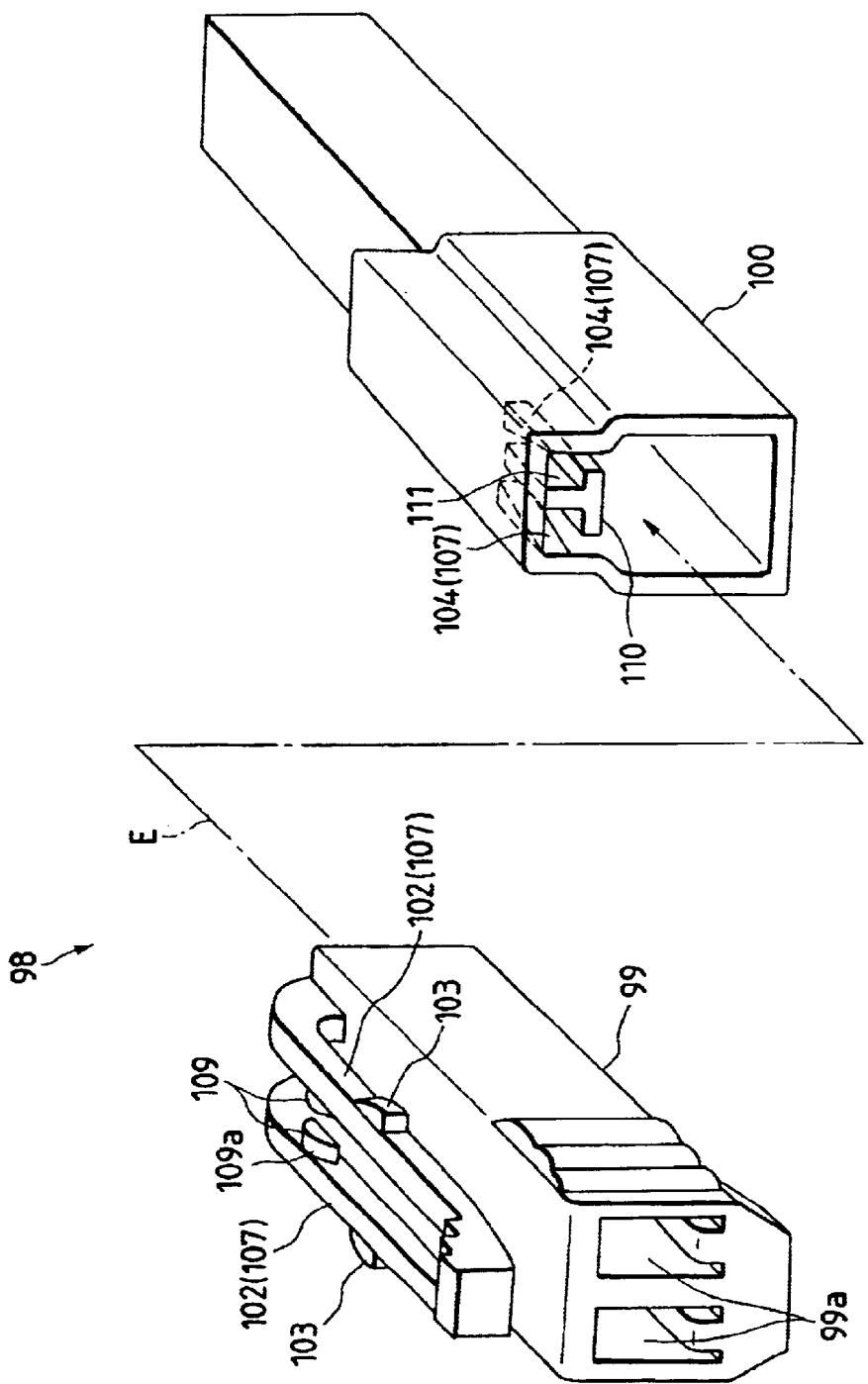

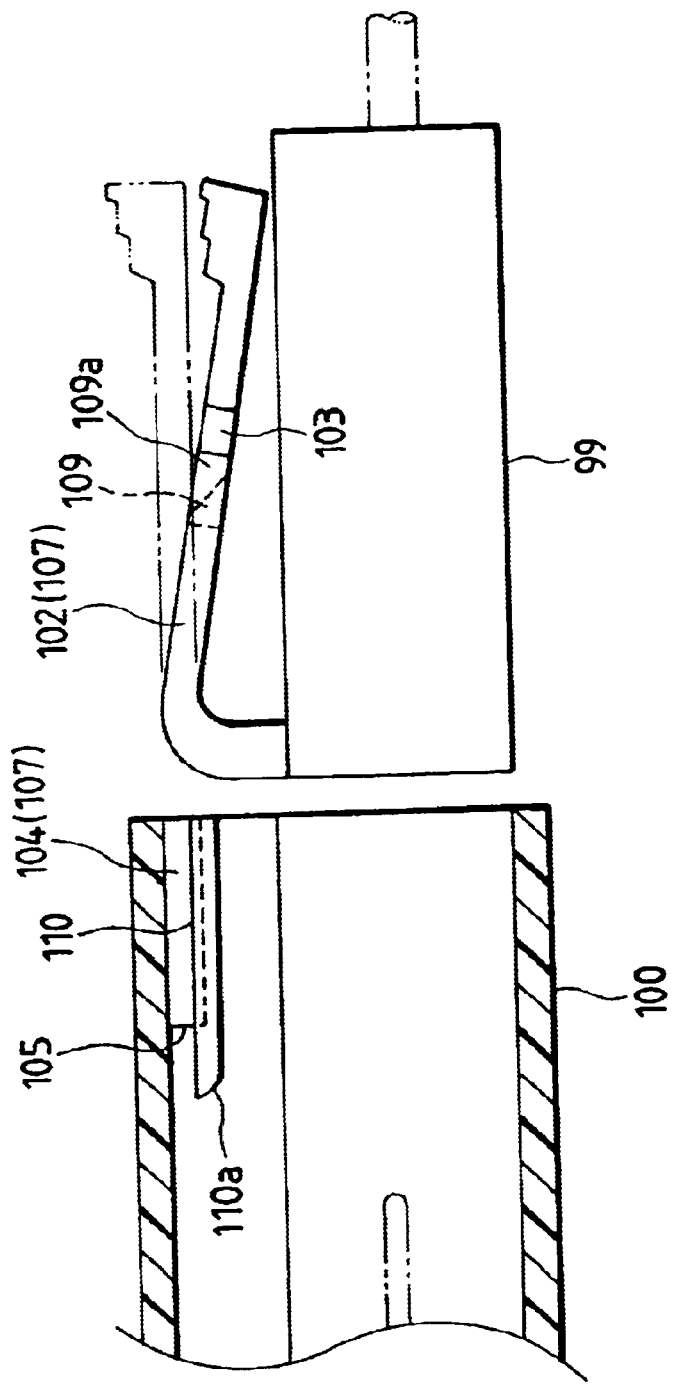

CONNECTOR LOCK MECHANISM

BACKGROUND OF THE INVENTION

1. Field of the Invention

The present invention relates to a connector lock mechanism which, when a set of male and female connectors are engaged with each other, if the length of the mutual engagement of the two connectors reaches a preset length, locks the mutually connected condition of the male and female connectors and, in particular, to an improved connector lock mechanism which is capable of detecting the incomplete engagement (half engagement) between the male and female connectors.

2. Description of the Related Art

Conventionally, when a plurality of electrical wires are electrically connected together or circuit boards equipped in various equipment are electrically connected to electrical wires, generally, there has been widely used a system in which such connection can be achieved by means of mutual engagement between a set of male and female connectors. That is, if a set of male and female connectors respectively formed of insulating resin or the like are engaged with each other, then male- and female-type terminals respectively stored within the female and male connectors are engaged with each other to thereby complete the mutual electrical connection between the male and female connectors. On the other hand, if the mutual engagement between the male and female connectors is removed, that is, if the two connectors are separated from each other, then the electrical connection between the male- and female-type terminals is likewise removed.

Therefore, the male and female connectors include a connector lock mechanism which is able to lock the two connectors in a well connected condition, that is, in such a manner that it can prevent inadvertent disengagement between the male and female connectors due to vibrations applied thereto under the connector operating environment.

An example of the conventional connector lock mechanisms is disclosed in Japanese Utility Model Publication No. 1-98484 of Heisei and the like. In particular, in the conventional connector lock mechanism, there are employed a set of male and female connectors 1 and 2 which are shown in FIG. 28. One connector 1 includes a pair of flexible arms 11 and 12, which respectively extend along the direction of arrow M in which one connector 1 can be engaged with the other connector, and two engaging portions 13 which are respectively formed on their associated flexible arms 11 and 12 in such a manner as to project therefrom. Also, the other connector 2 includes a pair of arm guide surfaces 21 and 22 which are capable of flexing their associated flexible arms 11 and 12 until the length of the mutual engagement between the two connectors reaches a preset length (i.e., when the two connectors are fully engaged), and two securing means 23 which, when the mutual engagement length reaches the preset length, can secure their associated engaging portions 13 to thereby prevent the two connectors from being removed from each other.

The two flexible arms 11 and 12 are disposed on the upper surface portion of one connector 1 in such a manner that they are spaced from each other in the lateral direction and are arranged parallel to each other. Also, the two engaging portions 13 respectively include projections which project outwardly in the lateral direction from the respective leading end portions of the two flexible arms 11 and 12.

Further, the two arm guide surfaces 21 and 22 of the other connector 2 are respectively formed on the two sides of the upper surface portion of the connector 2 in such a manner that their associated engaging portions 13 can be contacted therewith when the two connectors 1 and 2 are operated for their mutual engagement. The arm guide surfaces 21 and 22 are also formed as tapered surfaces which are able to flex their associated flexible arms 11 and 12 inwardly in the lateral direction as the mutual engagement between the two connectors progresses.

Moreover, the securing means 23 includes cavities which are respectively formed in front of the arm guide surfaces 21 and 22 in such a manner that their associated engaging portions 13 can be fitted into the securing means 23. If the connector mutual engagement advances, then male- and female-type terminals (not shown) respectively stored within the respective connectors start to be connected together. Upon further advancement the engaging portions 13 of one connector 1 are respectively engaged with the securing means 23 of the other connector 2. Thus, the male- and female-type terminals stored within their respective connectors are connected together electrically in a necessary and sufficient contact condition.

When the engaging portions 13 of one connector 1 are respectively engaged with the securing means 23 of the other connector 2, the inwardly flexed conditions of the respective flexible arms 11 and 12 are returned back to their original conditions. A key 24 is then inserted between the engaging portions 13 and 13 to prevent the two flexible arms 11 and 12 from being flexed again. Thus, the connectors are locked in a mutual engagement condition.

To remove such locked condition, the key 24 may be pressed down to a retreat space 25 formed below the key 24, so that it is no longer between the pair of engaging portions 13 and 13. After the locked condition of the flexible arms 11 and 12 is removed, if the two connectors 1 and 2 are pulled apart, then the connectors can be disengaged.

The pressing force necessary to bring the two connectors 1 and 2 into mutual engagement in the above-mentioned manner varies depending on the dimensional errors of the connectors 1, 2, and the dimensional errors of the male- and female-type terminals stored within their respective connectors. For example, as shown in FIG. 29, even if the engaging operation is executed with a given pressing force, there can occur an operation mistake or a wrong operation; that is, the engaging operation can be ended in a partially engaged condition in which the engaging portions 13 of the flexible arms 11 and 12 do not arrive at their associated securing means 23 but they remain in the flat portions 21a and 22a of the arm guide surfaces 21 and 22 which are located before the securing means 23.

If the connectors are used in such incomplete or partially engaged condition, for example, in a wire harness connector which is used in an automobile, there is a possibility that the mutual engagement between the two connectors 1 and 2 can be removed by vibrations applied thereto while the automobile is running and thus the electrical system of the automobile can be dysfunctional to thereby incur an accident.

In view of this, conventionally, after the engagement step is completed, there has been carried out a conduction test which checks the connectors to confirm that they are fully engaged.

However, as shown in FIG. 29, even in the partially engaged condition, when the mutual engagement length between the two connectors 1 and 2 is relatively large, there can occur a case in which the female- and male-type terminals respectively stored within their associated connectors 1 and 2 can be connected together electrically. In particular, contact resistance caused by the connection of the male- and female-type terminals can maintain the mutually connected condition between the two connectors. As a result, there is a possibility that the conduction test will provide a positive conduction test result despite the fact that the connectors are not fully engaged; that is, the partial engagement between the two connectors can be overlooked.

In view of the above, for example, in Japanese Patent Publication No. 9-180820 of Heisei and the like, there is proposed a partial engagement preventive connector lock mechanism in which, in order to be able to detect the partial engaged condition through the conduction test, there are provided within the connector housings compression springs which are used to apply repulsive forces to the male and female connectors 1 and 2 in their mutually removing directions.

With the use of this structure, if the repulsive forces (spring constants) of the compression springs are set larger than the contact resistance caused by the mutual connection between the male and female terminals, then, when the connectors are engaged together in a partial engaged condition, the two connectors 1 and 2 can be forced apart from each other by the repulsive forces of the compression springs until the mutually connected condition between the male- and female-type terminals is removed, which makes it possible to detect the partial engagement condition positively.

However, with use of the above-mentioned structure which employs the compression springs which are separate parts, not only the number of parts required in the connectors and the number of assembling steps thereof increase, which in turn increases the cost of the connector, but also a storage space for the compression springs within the connector must be provided, thereby increasing the sizes of the connectors.

SUMMARY OF THE INVENTION

The present invention aims at eliminating the above-mentioned drawbacks found in the conventional connector lock mechanisms. Accordingly, it is an object of the invention to provide a connector lock mechanism which does not incur an increase in the number of parts required in connectors and the number of assembling steps thereof, but is positively able to detect the engaged condition between the male and female connectors.

In attaining the above object, according to the present invention, there is provided a connector lock mechanism for locking the connected condition of a set of male and female connectors, the connector lock mechanism comprising: a flexible arm so disposed on one of the male and female connectors as to extend along a direction in which one connector can be engaged with the other connector; an engaging portion disposed on the flexible arm; an arm guide surface disposed on the other connector for flexing the flexible arm until the length of the mutual engagement between the two connectors reaches a preset length; and, securing means disposed on the other connector and, when the connector mutual engagement length reaches the preset length, being capable of securing the engaging portion of the flexible arm to thereby prevent the two connectors from being removed from each other.

In particular, the present connector lock mechanism is characterized by a connector removing mechanism which comprises: a flexible elastic piece formed integrally with one connector; and, a push-out guide surface which is formed integrally with the other connector and also which, when the male and female connectors are operated for their mutual engagement, deforms the flexible elastic piece elastically to thereby generate a push-out force separating the two connectors from each other in their mutually removing directions, while the elasticity of the flexible elastic piece and the inclination angle of the push-out guide surface are set such that the push-out force to be generated by the connector removing mechanism is greater than contact resistance caused by mutual connection between male- and female-type terminals respectively held within their associated connectors.

According to the above-structured connector lock mechanism, when a set of male and female connectors are operated for their mutual engagement, the connector removing mechanism generates a push-out force which separates or removes the set of male and female connectors from each other in their mutually removing directions. Since the push-out force to be generated by the connector removing mechanism is set larger than the contact resistance caused by the mutual connection between the male- and female-type terminals respectively stored within their associated connectors, if the male and female connectors are partially engaged with each other, then both of the two connectors are pushed back in their mutually removing directions at least until the mutually connected condition between the male- and female-type terminals is removed completely, which makes it possible to detect the partially engaged condition between the two connectors without fail.

Also, the flexible elastic piece and push-out guide surface forming the connector removing mechanism are respectively formed integrally with their associated connectors. Therefore, when compared with a conventional mechanism which uses separate parts such as compression springs, not only the reliability of the connectors can be secured but also the costs of the connectors can be reduced without incurring any inconveniences, for example, without increasing the number of parts required in the connectors and the number of the assembling steps thereof.

Also, in the above-mentioned connector lock mechanism, preferably, the flexible arm may also serve as the flexible elastic piece and the arm guide surface may also serve as the push-out guide surface. That is, in the present preferred embodiment, the respective connectors can be simplified in structure, which in turn can enhance the moldability of the connectors.

Further, in the above-mentioned connector lock mechanism, preferably, within the range of the above-mentioned mutual engagement between the male and female connectors, the inclination angle of the push-out guide surface may be changed properly in the intermediate portion thereof in such a manner that a greater push-out force can be generated in the range of the mutual connection between the above-mentioned male- and female-type terminals than in the unconnected condition between the male- and female-type terminals. That is, in the thus structured preferred embodiment, in the unconnected condition between the male- and female-type terminals in which the mutual resistance between the male- and female-type terminals does not act, the push-out force to be generated by the connector removing mechanism can be controlled to a minimum, which makes it possible to save an operation force necessary for mutual engagement between the male and female connectors. Therefore, the operation for mutual engagement between the male and female connectors can be improved in efficiency.

Still further, in the above-mentioned connector lock mechanism, preferably, the flexible elastic piece may be formed integrally with the flexible arm, and a wrong operation preventive piece, which is used to prevent the male and female connectors from being engaged with each other while the flexible arm is flexed in its locking removed condition, may be formed integrally with the flexible arm. That is, in the present preferred embodiment, even if the mutual engagement between the male and female connectors is executed in error while the flexible arm is flexed in its locking removed condition, the connector removing mechanism is prevented from operating normally in a condition where the position of the flexible elastic piece is shifted from the position of the push-out guide surface. Therefore, the mutual engagement between the male and female connectors due to the inadvertent flexing of the flexible arm can be prevented, thereby being able to enhance the reliability of the connector removing mechanism.

Yet further, in the above-mentioned connector lock mechanism, preferably, the above-mentioned flexible elastic piece and push-out guide surface may be provided in two or more sets. That is, in the present preferred embodiment, if the operation timings of the respective sets of flexible elastic pieces and push-out guide surfaces are shifted from one another, then the push-out force to be generated by the connector removing mechanism can be made to vary. Also, if the two or more sets of flexible elastic pieces and push-out guide surfaces are operated simultaneously, then a large push-out force can be provided easily. Therefore, even if the number of terminals to be stored within the respective connectors is large, there can be obtained a necessary and sufficient push-out force.

Moreover, in the above-mentioned connector lock mechanism, preferably, while the flexible arm is held in its flexed condition, a push-out force acting on the male and female connectors in their mutually removing directions may be always generated due to the flexed condition of the flexible elastic piece; and, if the male and female connectors are engaged with each other completely, then the flexed conditions of the flexible arm and flexible elastic piece may be removed, thereby being able to remove the push-out force acting on the male and female connectors in their mutually removing directions. Therefore, when the male and female connectors are completely engaged with each other, the flexible elastic piece, together with the flexible arm, can be returned to its original condition, which makes it possible to prevent the fatigue of the flexible elastic piece caused by the long flexed condition thereof.

BRIEF DESCRIPTION OF THE DRAWINGS

FIG. 2 is a perspective view of the main portions of a female connector shown in FIG. 1;

FIG. 3 is an explanatory view of the operation of the first embodiment shown in FIG. 1, wherein

FIG. 4 is an explanatory view of the operation of the mutually connected condition between male- and female-type terminals respectively stored within their associated connectors shown in FIG. 1, in particular.

FIG. 10 is a plan view of the main portions of the third embodiment shown in FIG. 8, showing an operation for mutual engagement between male and female connectors, in particular.

FIG. 11 is an exploded perspective view of a fourth embodiment of a connector lock mechanism according to the invention;

FIG. 12 is a plan view of the main portions of the fourth embodiment shown in FIG. 11, showing an operation for mutual engagement between male and female connectors in the fourth embodiment, in particular.

FIG. 13 is an exploded perspective view of a fifth embodiment of a connector lock mechanism according to the invention;

FIG. 15 is a plan view of the main portions of the fifth embodiment shown in FIG. 13, in particular.

FIG. 16 is an exploded perspective view of a sixth embodiment of a connector lock mechanism according to the invention;

FIG. 17 is a longitudinal section view of the sixth embodiment shown in FIG. 16, showing a state thereof before the male and female connectors thereof are engaged together;

DETAILED DESCRIPTION OF THE PREFERRED EMBODIMENTS

Now, description will be given hereinbelow in detail of the preferred embodiments of a connector lock mechanism according to the invention with reference to the accompanying drawings.

Figure 1:
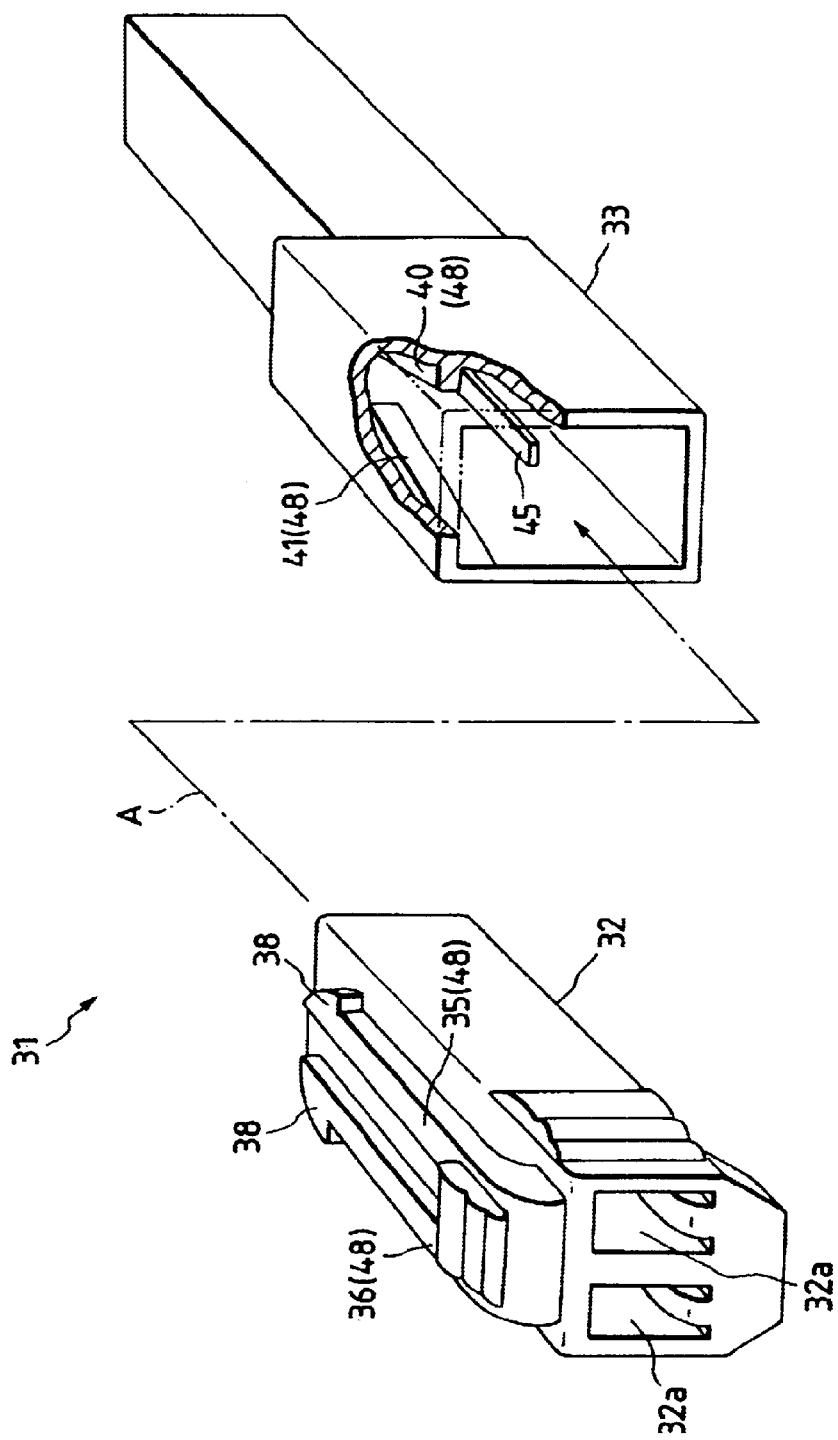
FIG. 1 is an exploded perspective view of a first embodiment of a connector lock mechanism according to the invention.

At first, description will be given below of a first embodiment of a connector lock mechanism according to the invention with reference to FIGS. 1 to 5. In particular, FIG. 1 is an exploded perspective view of the first embodiment of a connector lock mechanism according to the invention; FIG. 2 is a perspective view of the main portions of a female connector shown in FIG. 1; FIG. 3 is an explanatory view of the operation of the first embodiment shown in FIG. 1; FIG. 4 is an explanatory view of the operation of the mutually connected condition between male and female terminals which produce the contact resistance when they are engaged together; and FIG. 5 is an explanatory view of variations in push-out forces which are caused to occur in a connector removing mechanism employed in the first embodiment shown in FIG. 1.

A connector lock mechanism 31 according to the first embodiment of the invention comprises a set of male and female connectors 32 and 33. One of the two connectors, that is, the male connector 32, includes a pair of flexible arms 35 and 36 which respectively extend in a direction where the male connector 32 can be engaged with the other connector 33 or female connector 33 (in FIG. 1, in a direction of an arrow A) and also which include engaging portions 38 respectively formed in their respective leading end portions thereof. The male connector 32 also includes two terminal storage chambers 32a therein in which two female-type terminals are respectively stored and retained.

The two flexible arms 35 and 36 respectively rise up from the rear end side of the housing upper wall of the male connector 32 and then extend toward the front end side thereof, while the rising base portions of the flexible arms 35 and 36 are joined together and are thus integrated into a united body. Also, the two flexible arms 35 and 36 are formed in such a manner that they are spaced from each other in the width (or lateral) direction of the male connector 32 and extend parallel to each other. Further, the engaging portions 38 of the flexible arms 35 and 36 respectively consist of projections which are formed in such a manner as to project outwardly in lateral direction of the male connector 32 from the respective leading end portions of their associated flexible arms 35 and 36. Each of the engaging portions 38 includes a tapered surface which is gradually inclined outwardly from the front end side of the connector housing toward the rear end side thereof.

On the other hand, the other connector, that is, the female connector 33, comprises a pair of arm guide surfaces 40 and 41 which respectively include securing means 43. The pair of arm guide surfaces 40 are capable of flexing the flexible arms 35 and 36 inwardly until the length of the mutual engagement between the male and female connectors reaches a preset length, while the securing means 43 are respectively formed integrally with their associated guide surfaces 40 and 41. When the mutual engagement length reaches the preset length, the securing means are capable of securing their associated engaging portions 38 of the male connector 32 to thereby lock the mutually engaged condition of the male and female connectors. The female connector 33 stores and holds therein two male-type terminals which respectively correspond to the partner male connector 32.

Also, as shown in FIGS. 2 and 3, the two arm guide surfaces 40 and 41 of the female connector 33 are respectively formed in the upper portions of the two inner side surfaces of the connector housing in such a manner that their associated engaging portions 38 and 38 of the male connector 32 can contact them when the two connectors are engaged with each other. The arm guide surfaces 40 and 41 respectively include tapered surfaces which are able to flex their associated flexible arms 35 and 36 inwardly as the connector mutual engagement advances. Also, the securing means 43 consist of stepped portions which are respectively formed in the rear end portions of the two arm guide surfaces 40 and 41 in such a manner as to be able to secure their associated engaging portions 38 of the male connector 32.

Next, description will be given below of an engaging operation to be executed for the mutual engagement of the above-mentioned male and female connectors 32 and 33.

Figure 3A:
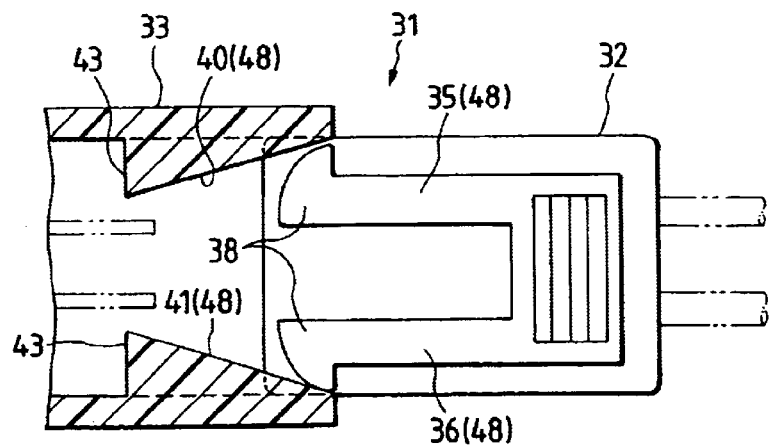
FIG. 3(a) shows an initial condition of mutual engagement between male and female connectors in the first embodiment.
Figure 4A:
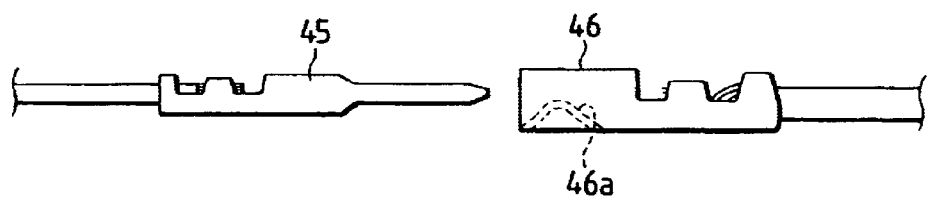
FIG. 4(a) shows an unconnected condition between the male- and female-type terminals.
Figure 5:
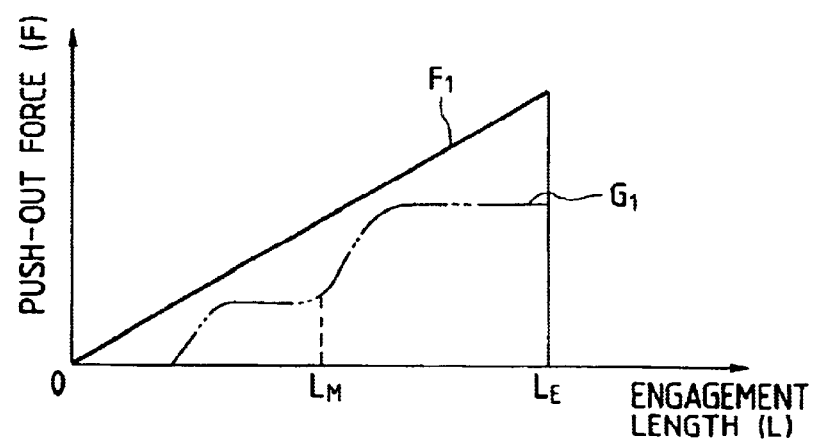
FIG. 5 is an explanatory view of the relation between a push-out force and an engagement length in the first embodiment shown in FIG. 1.

At first, in the initial stage of the connector engagement, as shown in FIGS. 3a and 4a, a male-type terminal 45 stored within the female connector 33 is not in contact with a female-type terminal 46 stored within the male connector 32, that is, the two terminals 45 and 46 are not connected together but are held in an unconnected condition.

Figure 3B:
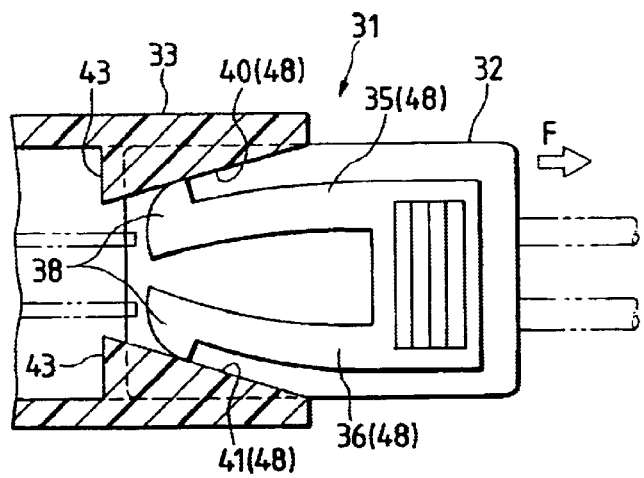
FIG. 3(b) shows an intermediate condition of the connector mutual engagement.
Figure 3C:
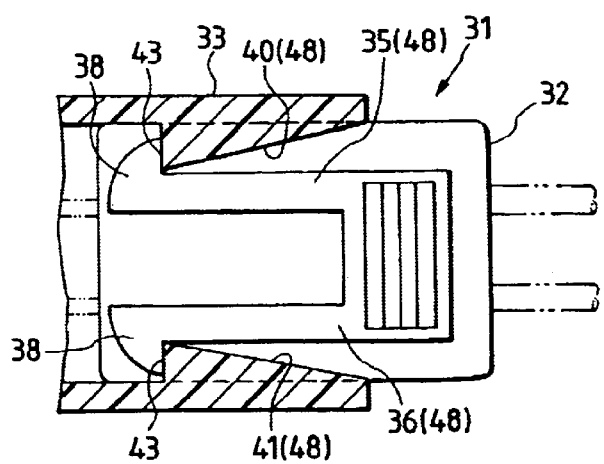
FIG. 3(c) shows a completed condition of the connector mutual engagement.
Figure 4B:
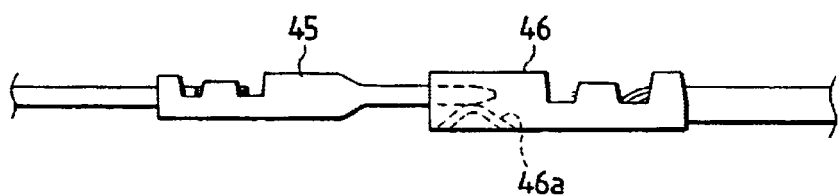
FIG. 4(b) shows a completely connected condition between the male- and female-type terminals.

If the mutual engagement between the male and female connectors advances to a certain degree, then, as shown in FIGS. 3b and 4b, the male- and female-type terminals 45 and 46, which are respectively stored within their associated connectors, begin to make contact with each other. If the connector mutual engagement advances further, then, as shown in FIG. 3c, when the engaging portions 38 of the male connectors 32 are respectively engaged with the securing means 43 of the female connectors 33, the male- and female-type terminals 45 and 46 of the two connectors 33 and 32 are connected together, that is, they are held in a connected condition in which they are contacted together with a sufficient engagement length for electrical connection.

Also, when the engaging portions 38 of the two flexible arms 35 and 36 of the male connector 32 are respectively engaged with the securing means 43 of the female connector 33, the flexed conditions of the two flexible arms 35 and 36 return to their respective original conditions. Thus, since the engaging surfaces of the flexible arms 35 and 36 extend at right angles to the connector engaging direction, the engaging surfaces of the flexible arms 35 and 36 prevent the male and female connectors from moving in their mutually removing directions, so that the mutually engaged condition of the male and female connectors can be locked.

In the connector lock mechanism 31 according to the present embodiment, the two flexible arms 35, 36 and two arm guide surfaces 40, 41 function as a connector removing mechanism 48. In other words, the present connector removing mechanism 48 is composed of the two flexible arms 35, 36 which are formed integrally with the male connector 32 and function as flexible elastic pieces, and the two arm guide surfaces 40, 41 which are formed integrally with the female connector 33 and function as push-out guide surfaces. Additionally, when the two, male and female, connectors are engaged together, the two arm guide surfaces 40, 41 serving as the push-out guide surfaces deform elastically the two flexible arms 35, 36 serving as the flexible elastic pieces to thereby generate a push-out force F which pushes out the male and female connectors in their mutually removing directions against the movements of the two connectors in their mutually engaging directions (see FIG. 3b).

Referring now to the above in more detail, the inclination angles of the flexible arms 35, 36 and arm guide surfaces 40, 41 are set in such a manner that the push-out force F to be generated by the connector removing mechanism 48 is larger than mutual contact resistance caused by and between the male- and female-type terminals 45 and 46 stored within their respective connectors.

As shown in FIG. 5, the characteristic line F1 of the connector removing mechanism 48 shows the relation between the push-out force F and connector mutual engagement length L, whereas a characteristic curved line G1 shows the relation between the mutual contact resistance of the male and female terminals 45, 46 and connector mutual engagement length when the two male and female connectors are engaged together.

The push-out force F that is generated by the connector removing mechanism 48 is a reaction force which is given from the arm guide surfaces 40, 41 and increases up to a level just before the connector mutual engagement length L reaches a locked condition, that is, a condition shown by a preset length LE (see FIG. 3c).

Also, the mutual contact resistance G between the male- and female-type terminals 45 and 46, as shown in FIG. 4b, increases greatly at and from an engagement length $L_M$ where a contact spring 46a disposed within the female-type terminal 46 begins to make contact with the male-type terminal 45.

As described above, in the connector lock mechanism 31 according to the present embodiment, when a set of male and female connectors 32 and 33 are engaged with each other, the connector removing mechanism 48 generates the push-out force F which pushes the male and female connectors 32 and 33 away from each other. Because the push-out force F to be generated by the connector removing mechanism 48 is set larger than the mutual contact resistance caused by and between the male and female terminals 45 and 46 respectively stored within their associated connectors, when the two connectors are held in their mutually partially engaged condition, both of the male and female connectors are caused to move in their mutually removing directions at least until the mutually connected condition between the male and female terminals 45 and 46 is removed.

Therefore, the present connector lock mechanism 31 is surely able to detect the mutually partially engaged condition between the male and female connectors and thus is surely able to prevent the possible overlooking of such connector partially engaged condition.

Also, since the flexible arms 35, 36 and arm guide surfaces 40, 41 forming the connector removing mechanism 48 are all formed integrally with their associated connector housings, when compared with the conventional connector lock mechanism which uses separate parts such as compression springs or the like, according to the present connector lock mechanism, the number of parts required in the connectors as well as the number of assembling steps thereof can be reduced, which makes it possible not only to secure the reliability of the connectors but also to reduce the manufacturing costs thereof.

Further, according to the present embodiment, the flexible arms 35 and 36 also serve as the flexible elastic pieces of the connector removing mechanism 48, while the arm guide surfaces 40 and 41 also serve as the push-out guide surfaces of the connector removing mechanism 48. Therefore, the structures of the respective connectors can be simplified, which makes it possible to enhance the moldability thereof as well as the yield rate of the products.

Next, description will be given below in detail of a second embodiment of a connector lock mechanism according to the invention with reference to FIGS. 6 and 7. In particular, FIG. 6 is an explanatory view of the operation of a connector lock mechanism according to the second embodiment of the invention, while FIG. 7 is an explanatory view of variations in the push-out force of a connector removing mechanism according to the second embodiment.

Figure 6:
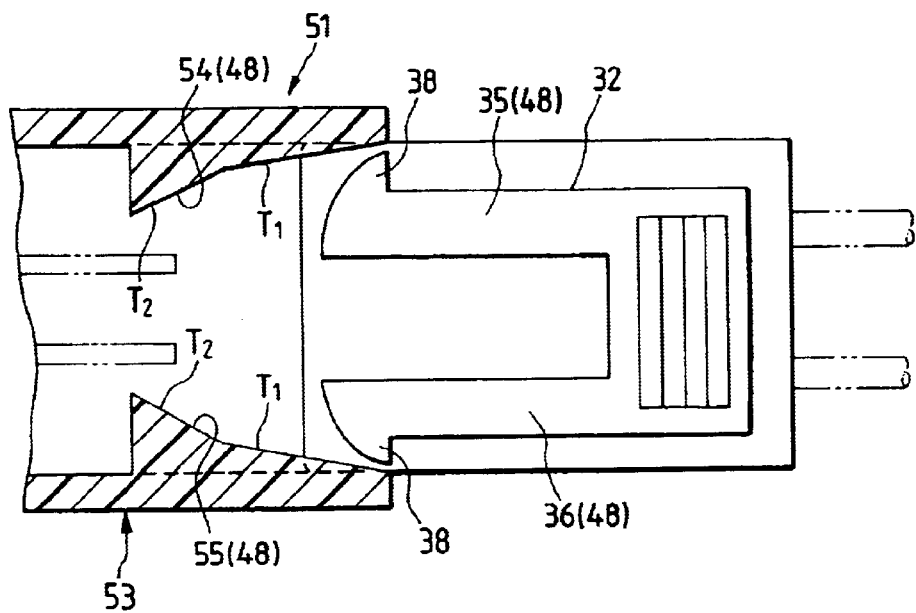
FIG. 6 is a plan view of the main portions of a second embodiment of a connector lock mechanism according to the invention.
Figure 7:
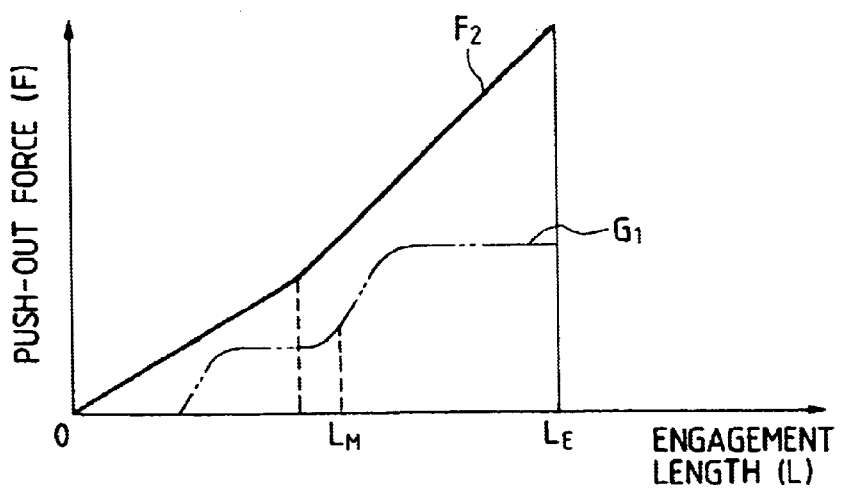
FIG. 7 is an explanatory view of the relation between a push-out force and an engagement length in the second embodiment shown in FIG. 6.

As shown in FIG. 6, in a connector lock mechanism 51 according to the second embodiment, the arm guide surfaces 40 and 41 employed in the connector lock mechanism 31 according to the first embodiment of the invention are improved, and the remaining portions of the connector lock mechanism 51 are similar in structure those of the first embodiment.

That is, according to the present embodiment, the flexible arms 35, 36 and engaging portions 38 respectively provided in the male connector 32 are the same as in the first embodiment, while the flexible arms 35 and 36 function as the flexible elastic pieces of the connector removing mechanism 48. In a female connector 53 which is an engaging partner connector of the male connector, there are formed arm guide surfaces 54 and 55 which are capable of flexing the flexible arms 35 and 36 when the male and female connectors 32 and 53 are operated for their mutual engagement. The arm guide surfaces 54 and 55 can serve as the push-out guide surfaces of the connector removing mechanism 48.

Referring in detail to the structure of the arm guide surfaces 54 and 55 according to the present embodiment, the inclination angles of the arm guide surfaces 54 and 55 functioning as the push-out guide surfaces are changed in their respective intermediate portions in order that, within the mutually engaged range of the male and female connectors 32 and 53, a larger push-out force can be generated in the mutually connected range of the male- and female-type terminals respectively stored within the their associated connectors than in an unconnected range in which the male and female terminals are not contacted with each other.

In other words, the arm guide surfaces 54 and 55 serving as the push-out guide surfaces are each composed of a first tapered surface T1 which is disposed in the front portion of the associated guide surface and is smoothly inclined, and a second tapered surface T2 which is disposed in the rear portion of the associated guide surface and is steeply inclined. Since the arm guide surfaces 54 and 55 are each composed of such two tapered surfaces having different inclination angles, the push-out force F to be generated by the connector removing mechanism 48 provides a characteristic line F2 as shown in FIG. 7.

As described above, in the connector lock mechanism 51 according to the present embodiment, the inclination angles of the arm guide surfaces 54 and 55 functioning as the push-out guide surfaces of the connector removing mechanism 48 are changed in their respective intermediate portions. For this reason, in the unconnected range in which the mutual contact resistance between the male and female terminals is not present, the push-out force F to be generated by the connector removing mechanism 48 can be controlled to a minimum. This not only can minimize an operation force necessary for mutual engagement between the male and female connectors but also makes it possible to carry out an operation for mutual engagement between the connectors with higher efficiency.

Figure 8:
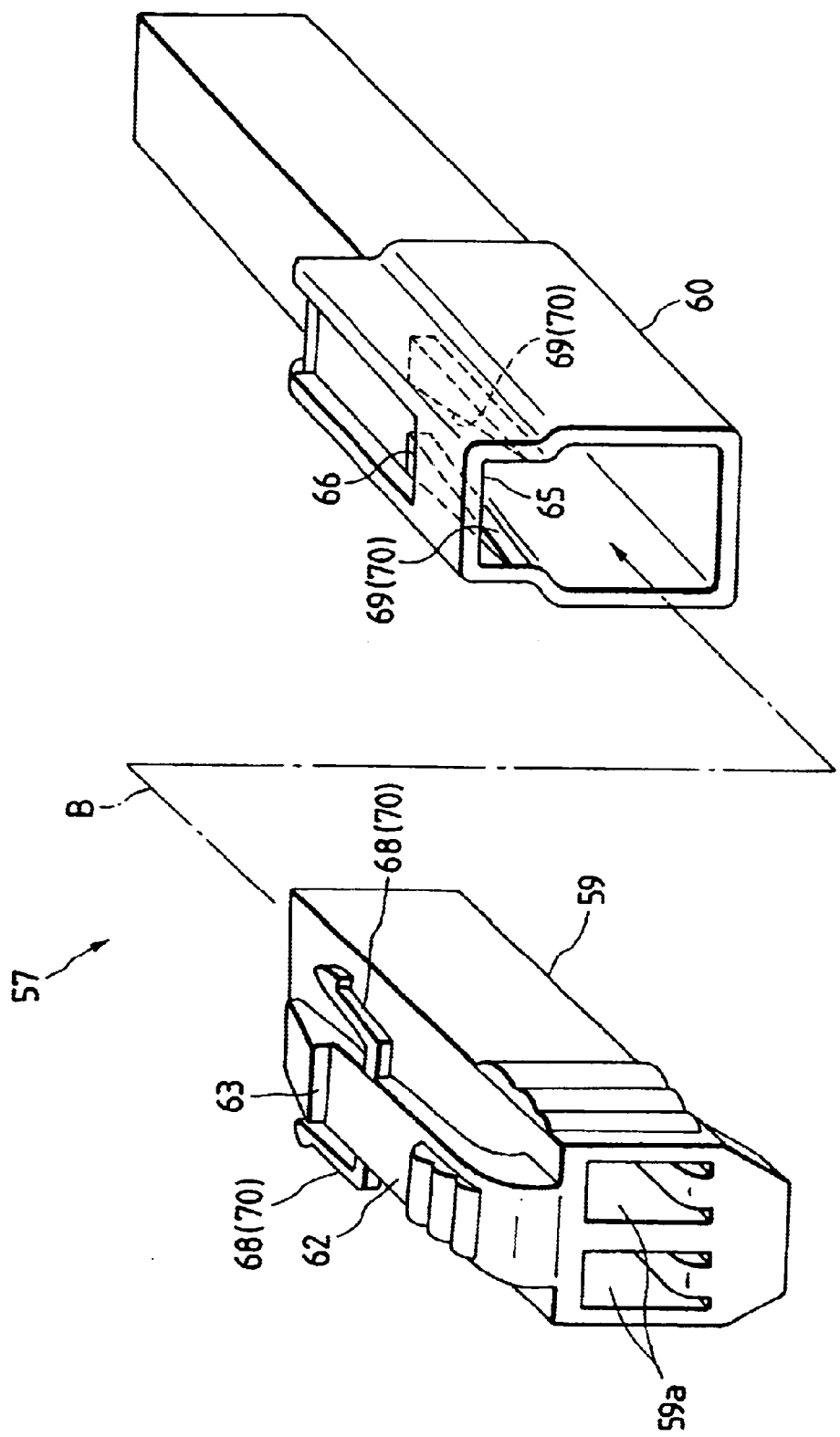
FIG. 8 is an exploded perspective view of a third embodiment of a connector lock mechanism according to the invention.
Figure 9:
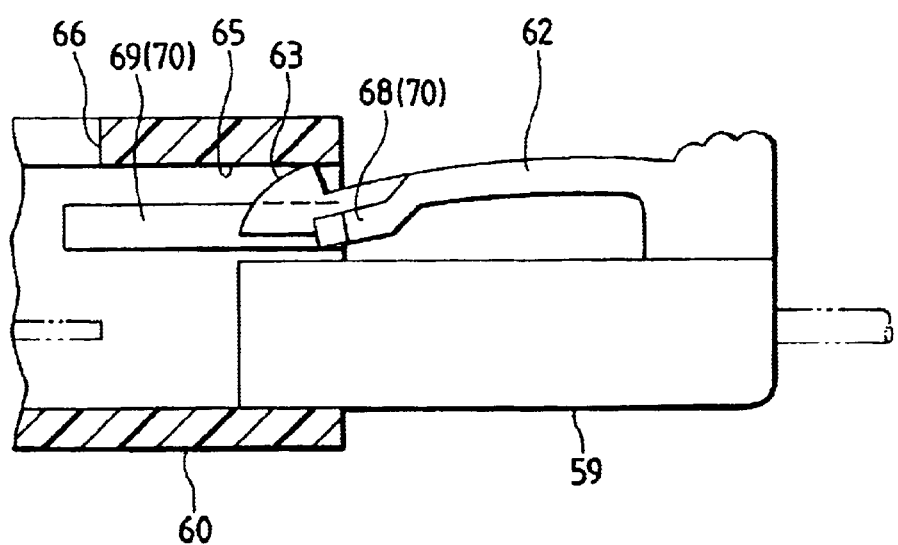
FIG. 9 is a longitudinal section view of an initial condition of the connector mutual engagement in the third embodiment shown in FIG. 8.

Next, description will be given below in detail of a third embodiment of a connector lock mechanism according to the invention with reference to FIGS. 8 to 10. In particular, FIG. 8 is an exploded perspective view of the third embodiment of a connector lock mechanism according to the invention, FIG. 9 is a longitudinal section view of an initial condition of the connector engagement in the third embodiment shown in FIG. 8, and FIG. 10 is an explanatory view of an operation for mutual engagement between the male and female connectors in the third embodiment shown in FIG. 8.

Specifically, a connector lock mechanism 57 according to the present embodiment relates to a set of male and female connectors 59 and 60. One of the two connectors, namely, the male connector 59, includes a single flexible arm 62 formed in such a manner as to extend along a direction thereof in which the male connector 59 can be engaged with the other connector, namely, the female connector 60, while the flexible arm 62 includes an engaging portion 63 formed integrally therewith. The male connector 59 further includes two terminal storage chambers 59*a* which are formed in the width direction of the male connector 59 and are capable of storing therein their respective female-type terminals.

The flexible arm 62 is structured such that it rises up from the rear end side of the housing of the male connector 59 and then extends toward the front end side thereof. Also, the engaging portion 63 is a projection which is provided in the leading end portion of the flexible arm 62 in such a manner as to project upwardly, while the upwardly projecting length of the engaging portion 63 increases gradually from the front end side of the connector housing toward the rear end side thereof.

On the other hand, the other connector, namely, the female connector 60 includes an arm guide surface 65 capable of downwardly flexing the flexible arm 62 until the mutual engagement length between the two connectors reaches a preset length, and securing means 66 which, when the connector mutual engagement length reaches the preset length, can secure the engaging portion 63 to thereby lock the connector mutually engaged condition. The arm guide surfaces 65 and securing means 66 are both formed integrally with the female connector 60. The female connector 60 also has two male-type terminals which respectively correspond to the female-type terminals stored within the male connector 59.

As shown in FIG. 9, the arm guide surface 65 is disposed in the inner surface of the upper wall of the female connector 60 in such a manner that, when the male and female connectors 59 and 60 are operated for mutual engagement, the engaging portion 63 can be contacted with the arm guide surface 65. In operation, the arm guide surface 65 flexes the flexible arm 62 downwardly as the connector mutual engagement advances. Also, the securing means 66 consists of a rectangular-shaped securing hole which is formed in the rear end portion of the arm guide surface 65 in such a manner that the engaging portion 63 can be fitted into the securing hole 66.

If the engaging portion 63 of the flexible arm 62 is engaged with the securing means 66 of the female connector 60, the flexed flexible arm 62 returns to its original condition. When the engaging portion 63 is engaged with the securing means 66, the respective engaging surfaces thereof prevent the male and female connectors from moving in their mutually removing directions because the engaging surfaces extend at right angles to the mutually engaging directions of the male and female connectors, so that the mutually engaged condition of the male and female connectors can be locked.

The present connector lock mechanism 57 further includes a connector removing mechanism 70. The present connector removing mechanism 70 is composed of two flexible elastic pieces 68 respectively formed integrally with the male connector 59, and two push-out guide surfaces 69 which are formed integrally with the female connector 60 and also which are capable of elastically deforming their associated flexible elastic pieces 68 in the connector mutual engagement to thereby generate a push-out force pushing back the male connector 59 in the engagement removing direction.

The two flexible elastic pieces 68 are respectively formed in such a manner that they project from the two side surfaces of the flexible arm 62 located near to the leading end portion thereof. As shown in FIG. 9, the two push-out guide surfaces 69 are respectively provided on the two side surfaces of the upper portion of the housing of the female connector 60 at the height position where their associated flexible elastic pieces 68 can be contacted with the push-out guide surfaces 69 when the flexible arm 62 is flexed downwardly by the arm guide surface 65.

Figure 10A:
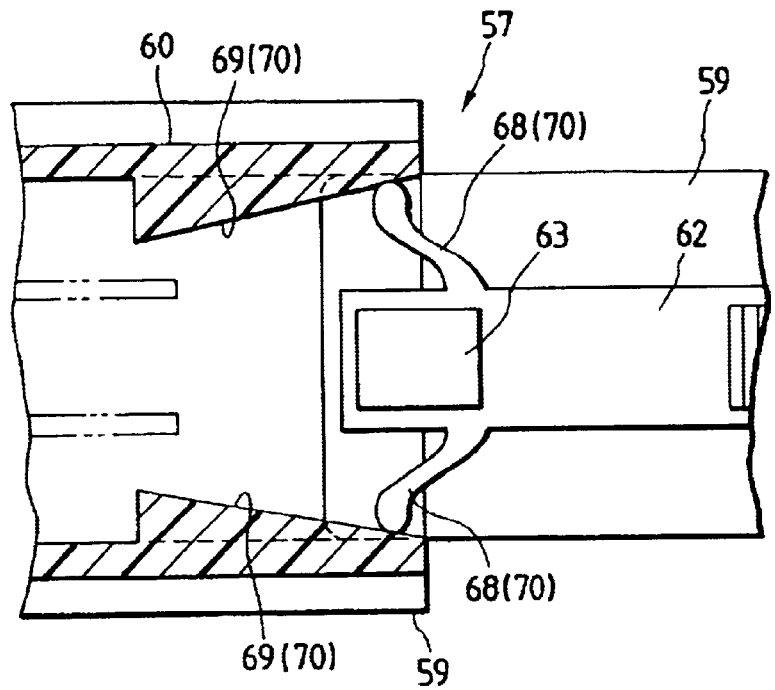
FIG. 10(a) shows an initial condition of the connector mutual engagement.

Also, as shown in FIG. 10*a*, the two push-out guide surfaces 69 are respectively tapered surfaces which are capable of flexing a pair of flexible elastic pieces 68 and 68 as the mutual engagement between the male and female connectors advances.

Further, according to the present connector removing mechanism 70, the elasticity of the flexible elastic pieces 68 and the inclination angles of the push-out guide surfaces 69 are set in such a manner that the push-out force to be generated by the flexing of the flexible elastic pieces 68 should be larger than the mutual contact resistance between the male- and female-type terminals respectively stored within their associated connectors.

Figure 10B:
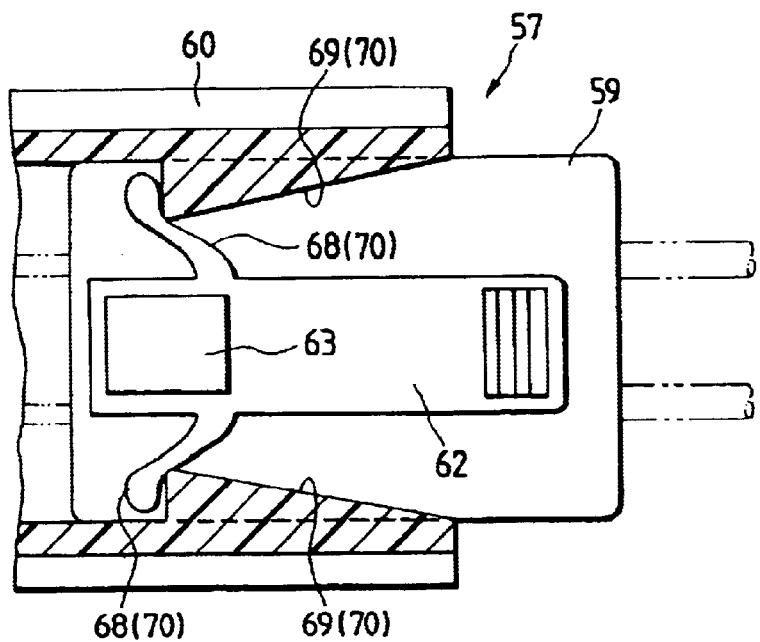
FIG. 10(b) shows a complete condition of the connector mutual engagement.

As shown in FIG. 10*b*, when the connector mutual engagement length reaches a preset length and thus the engaging portion 63 is engaged with the securing means 66, the flexible elastic pieces 68 pass beyond the rear ends of their associated push-out guide surfaces 69 so that they are free from the pressures of their associated push-out guide surfaces 69. By the way, the push-out force F to be generated by the connector removing mechanism 70 has the same characteristic line as the characteristic line F1 shown in FIG. 5.

As described above, in the connector lock mechanism 57 according to the present embodiment, when a set of male and female connectors 59 and 60 are engaged together, the connector removing mechanism 70 generates the push-out force which pushes the set of male and female connectors 59 and 60 in directions where they are removed from each other. Since the push-out force to be generated by the connector removing mechanism 70 is set larger than the mutual contact resistance between the male- and female-type terminals respectively stored within their associated connectors, in a partially engaged condition where the male and female connectors are partially engaged with each other, the two connectors are both pushed away from each other at least until the mutually connected condition between the male- and female-type terminals is removed. This makes it possible to detect the partially engaged condition between the male and female connectors positively, thereby being able to surely prevent the possible overlooking of the partially engaged condition.

Also, because the flexible elastic pieces 68 and push-out guide surfaces 69 forming the connector removing mechanism 70 are respectively formed integrally with their associated connector housings, when compared with the conventional connector removing mechanism using separate parts such as compression springs, the number of parts required in the connectors as well as the number of assembling steps thereof can be reduced, which makes it possible to reduce the manufacturing costs of the connectors.

Figure 12A:
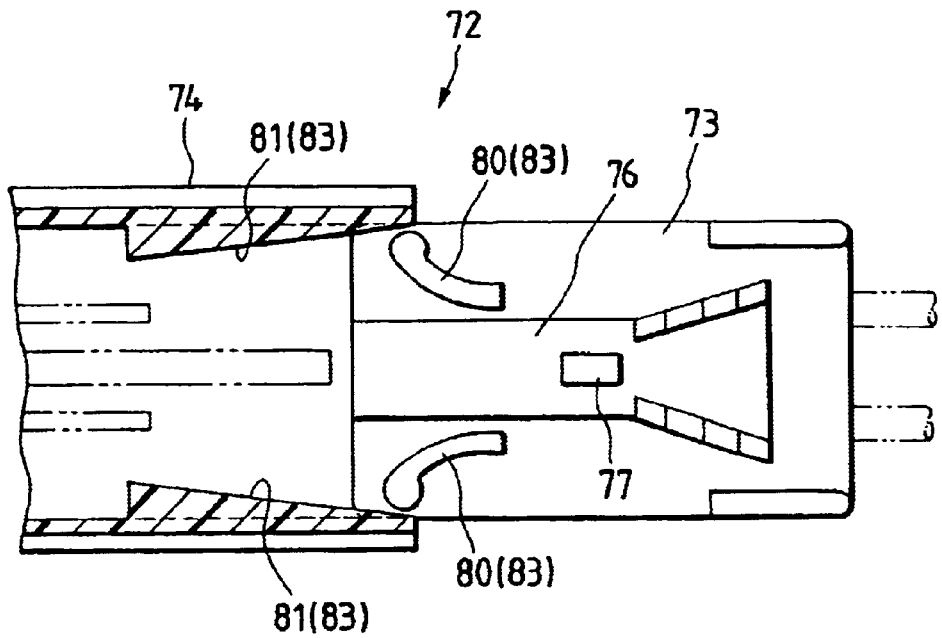
FIG. 12(a) shows an initial condition of the connector mutual engagement.

Next, description will be given below in detail of a fourth embodiment of a connector lock mechanism according to the invention with reference to FIGS. 11 and 12. In particular, FIG. 11 is an exploded perspective view of the fourth embodiment of a connector lock mechanism according to the invention, and FIG. 12 is an explanatory view of an operation for mutual engagement between the male and female connectors in the fourth embodiment shown in FIG. 11.

Specifically, a connector lock mechanism 72 according to the present embodiment comprises a set of male and female connectors 73 and 74. One of the two connectors, namely, the male connector 73 includes a single flexible arm 76 formed in such a manner as to extend along a direction thereof in which the male connector 73 can be engaged with the other connector, namely, the female connector 74, while the flexible arm 76 includes an engaging portion 77 formed integrally therewith. The flexible arm 76 is provided on the housing of the male connector 73 in such a manner that it rises up from the rear end side of the male connector 73 housing and then extends toward the front end side thereof.

The engaging portion 77 consists of a projection which is formed on the flexible arm 76 in such a manner as to project upwardly therefrom, while the upwardly projecting length of the engaging portion 77 increases gradually from the front end side of the connector housing toward the rear end side thereof. The present male connector 73 includes, in the width direction thereof, two terminal storage chambers 73a which are capable of storing their associated female-type terminals therein.

On the other hand, the other connector, namely, the female connector 74 includes an arm guide surface 78 capable of flexing the flexible arm 76 until the mutual engagement length between the male and female connectors reaches a preset length. The arm guide surface 78 includes securing means 79 which is formed integrally with the arm guide surface 78 and also which, when the connector mutual engagement length reaches the preset length, can secure the engaging portion 77 to thereby lock the connector mutually engaged condition. The arm guide surface 78 is formed in the inner upper surface of the housing of the female connector 74 in such a manner that the engaging portion 77 can be contacted with the arm guide surface 78 when the male and female connectors 73 and 74 are operated for their mutual engagement. Thus, in operation, the arm guide surface 78 is able to flex the flexible arm 76 as the mutual engagement between the male and female connectors advances. Also, the engaging means 79 consists of a rectangular-shaped securing hole which is formed in the rear end portion of the arm guide surface 78 in such a manner that the engaging portion 77 can be engaged with the engaging means 79. Naturally, the female connector 74 includes two male-type terminals which correspond the female-terminals stored within the male connector 73.

In the mutual engagement between the above-structured male and female connectors 73 and 74, when the engaging portion 77 of the flexible arm 76 of the male connector 73 is engaged with the securing means 79 of the female connector 74, the flexible arm 76 is returned from the flexed condition to its original condition. And, if the engaging portion 77 is engaged with the securing means 79, then their respective engaging surfaces prevent the male and female connectors from moving in their mutually removing directions because they intersect at right angles to the connector mutual engaging direction, so that the mutually engaged condition between the male and female connectors can be locked.

In the connector lock mechanism 72 according to the present embodiment, there is provided a connector removing mechanism 83. In particular, the present connector removing mechanism 83 is composed of two flexible elastic pieces 80 respectively formed integrally with the male connector 73, and two push-out guide surfaces 81 respectively formed integrally with the female connector 74 and also, when the male and female connectors are operated for their mutual engagement, capable of elastically deforming their associated flexible elastic pieces 80 to thereby generate a push-out force which pushes the male and female connectors in their mutually removing directions where the connector mutual engagement can be removed.

The above-mentioned flexible elastic pieces 80 are respectively provided on the two sides of the flexible arm 76 of the housing of the male connector 73 in such a manner as to project directly therefrom, while the push-out guide surfaces 81 are respectively formed on the two side surfaces of the housing of the female connector 74 at such height position as their associated flexible elastic pieces 80 can be contacted with the push-out surfaces 81.

As shown in FIG. 12, the push-out guide surfaces 81 are tapered surfaces which are capable of flexing their associated flexible elastic pieces 80 inwardly as the connector mutual engagement advances.

In the above-mentioned connector removing mechanism 83, the elasticity of the flexible elastic pieces 80 and the inclination angles of the push-out guide surfaces 81 are set in such a manner that the push-out force to be generated by the flexing of the flexible elastic pieces is larger than the mutual contact resistance caused by and between the male and female terminals.

Figure 12B:
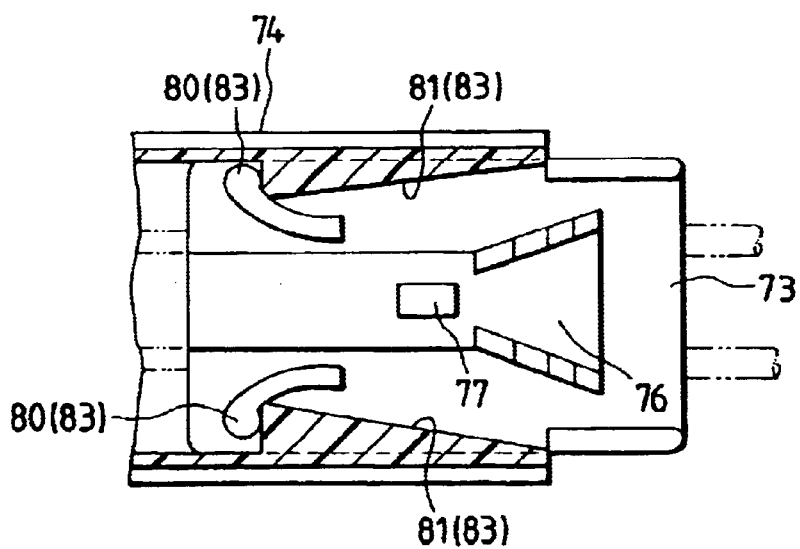
FIG. 12(b) shows a complete condition of the connector mutual engagement.

When the mutual engagement length between the connectors reaches a preset length and thus the engaging portion 77 is engaged with the securing means 79, as shown in FIG. 12(b), the flexible elastic pieces 80 respectively pass through their associated push-out guide surfaces 81 while in contact therewith and are then secured to the rear ends of their associated push-out guide surfaces 81. It should be noted that the push-out force of the present connector removing mechanism 83 provides the same characteristic line as the characteristic line F1 shown in FIG. 5.

In the above-mentioned connector lock mechanism 72 according to the present embodiment, when a set of male and female connectors 73 and 74 are operated for their mutual engagement, the connector removing mechanism 83 generates the push-out force which pushes the male and female connectors in their mutually removing directions where the male and female connectors 73 and 74 are removed from each other. Since the push-out force to be generated by the connector removing mechanism 83 is set larger than the mutual contact resistance caused by and between the male- and female-type terminals respectively stored within their associated connectors, when the male and female connectors are partially engaged with each other, the male connector is pushed back in the removing direction at least until the mutually connected condition between the male- and female-type terminals is removed completely. This makes it possible to surely detect the half engagement between the male and female connectors 73 and 74 without overlooking it.

Also, since the flexible elastic pieces 80 and push-out guide surfaces 81 forming the present connector removing mechanism 83 are respectively formed integrally with their associated connectors, when compared with the conventional connector removing mechanism which employs separate parts such as compression springs, the number of parts required in the connectors as well as the number of assembling steps thereof can be reduced, thereby being able to reduce the manufacturing costs thereof.

Next, description will be given below in detail of a fifth embodiment of a connector lock mechanism according to the invention with reference to FIGS. 13 to 15. In particular, FIG. 13 is an exploded perspective view of the fifth embodiment of a connector lock mechanism according to the invention, FIG. 14 is a longitudinal section view of the fifth embodiment shown in FIG. 13, showing a partially engaged condition between the male and female connectors, and FIG. 15 is an explanatory view of the operation of the mutual engagement between the male and female connectors in the fifth embodiment shown in FIG. 13.

Specifically, a connector lock mechanism 85 according to the present embodiment relates to a set of male and female connectors 86 and 87. One of the two connectors, namely, the male connector 86 includes a single flexible arm 88 formed in such a manner as to extend along a direction thereof (in FIG. 13, in the direction of an arrow D) in which the male connector 86 can be engaged with the other connector, namely, the female connector 87, while the flexible arm 88 includes an engaging portion 89 formed integrally therewith. The flexible arm 88 rises up from the front end side of the male connector 86 housing and then extends toward the rear end side and, the engaging portion 89 of the flexible arm 88 projects upwardly from the upper surface of the flexible arm 88, while the projecting length of the engaging portion 89 increases gradually from the front end side of the male connector 86 housing toward the rear end side thereof. It is noted that the present male connector 86 includes in the width direction thereof two terminal storage chambers 86a respectively capable of storing female-type terminals therein.

On the other hand, the other connector, namely, the female connector 87 includes an arm guide surface 91 with securing means 92 formed integrally therewith. The arm guide surface 91 is capable of flexing the flexible arm 88 until the mutual engagement length between the male and female connectors reaches a preset length. The securing means 92 of the arm guide surface 91, when the mutual engagement length reaches the present length, is capable of securing the engaging portion 89 of the flexible arm 88 to thereby lock the mutually engaged condition between the male and female connectors. Also, the securing means 92 consists of a rectangular-shaped securing hole which is formed in front of the arm guide surface 91 in such a manner that the engaging portion 89 of the flexible arm 88 can be fitted into the securing means 92. The present female connector 87 stores and holds therein two male-type terminals which corresponds to the female-type terminals held within the male connector 86.

As shown in FIG. 14, the arm guide surface 91 is formed on the side surface of the housing of the female connector 87 in such a manner that, when the male and female connectors 86 and 87 are operated for their mutual engagement, the engaging portion 89 of the flexible arm 88 contact the arm guide surface 91. The flexible arm 88 is gradually flexed downwardly as the connector mutual engagement advances. However, when the engaging portion 89 of the flexible arm 88 is engaged with the securing means 92 of the female connector 87, the flexible arm 88 is returned from the flexed condition back to its original condition. In this operation, because the engaging surfaces thereof intersect at right angles to the connector engaging direction, they prevent the male and female connectors from moving in their mutually removing directions to thereby lock the mutually engaged condition between the male and female connectors.

In the connector lock mechanism 85 according to the present embodiment, one connector, namely, the male connector 86, includes a pair of flexible elastic pieces 94 respectively formed integrally with the male connector 86. The pair of flexible elastic pieces 94 are respectively arranged in such a manner that they project laterally from the their associated side surfaces of the flexible arm 88 of the male connector 86.

Also, the other connector, namely, the female connector 87, includes a pair of push-out guide surfaces 95 respectively formed integrally with the female connector 87. The push-out guide surfaces 95, when the male and female connectors 86 and 87 are engaged with each other, are capable of deforming the flexible elastic pieces 94 to thereby generate a push-out force which pushes back the male and female connectors in their mutually removing directions. The push-out guide surfaces 95 and flexible elastic pieces 94 cooperate together in forming a connector removing mechanism 96.

Figure 14A:
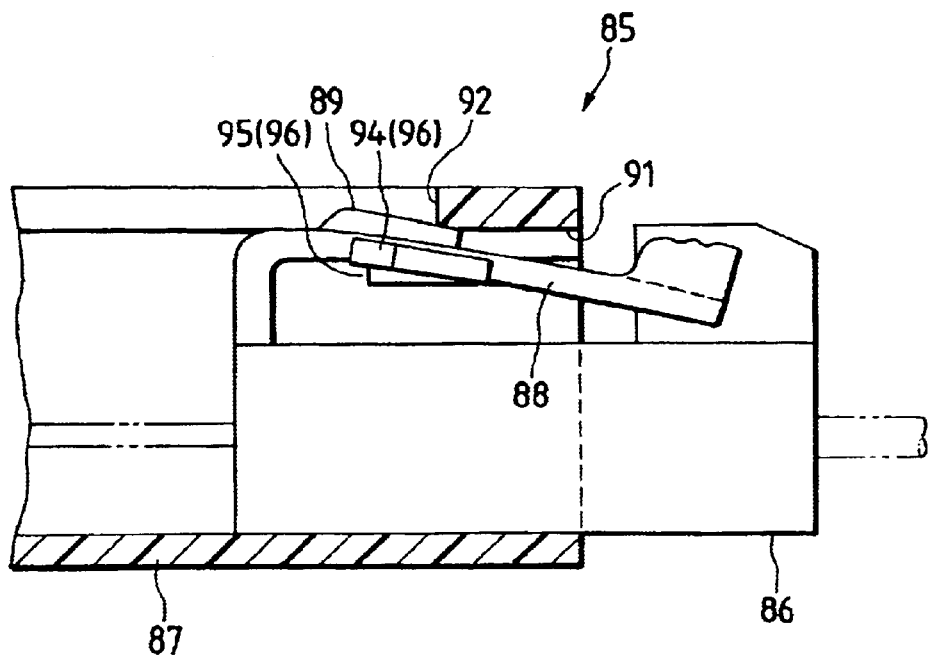
FIG. 14(a) and FIG. 14(b) are longitudinal section views of the fifth embodiment shown in FIG. 13, showing a partially engaged condition between male and female connectors in the fifth embodiment.
Figure 15A:
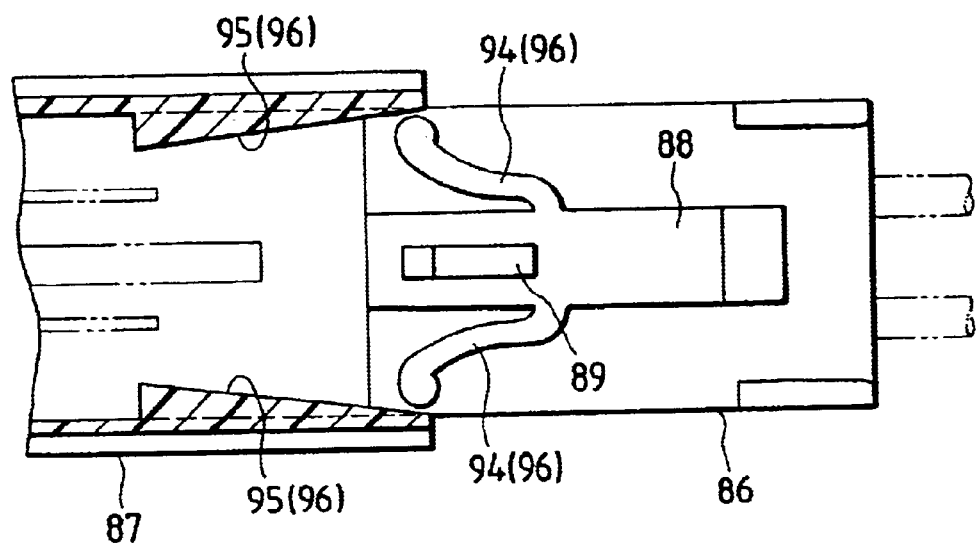
FIG. 15(a) shows an initial condition of mutual engagement between male and female connectors in the fifth embodiment.

As shown in FIGS. 13 and 15, the push-out guide surfaces 95 are respectively formed on the two side surfaces of the female connector 87 at such a height that, while the flexible arm 88 is flexed, the flexible elastic pieces 94 on the flexible arm 88 can be respectively contacted with the push-out guide surfaces 95. Further, as shown in FIGS. 14(a) and 15(a), the push-out guide surfaces 95 respectively consist of tapered surfaces which are able to flex their associated flexible elastic pieces 94 inwardly as the connector engagement advances.

In a state where the flexible elastic pieces 94 are held in contact with their associated push-out guide surfaces 95 during the flexed condition of the flexible arm 88, there is always generated the push-out force which pushes back the male and female connectors in their mutually removing directions.

Here, in the connector removing mechanism 96 according to the present embodiment, the elasticity of the flexible elastic pieces 94 and the inclination angles of the push-out guide surfaces 95 are set in such a manner that the push-out force to be generated by the flexing of the flexible elastic pieces 94 is larger than the mutual contact resistance caused by and between male-type and female-type terminals which are respectively stored within the two connectors.

Figure 14B:
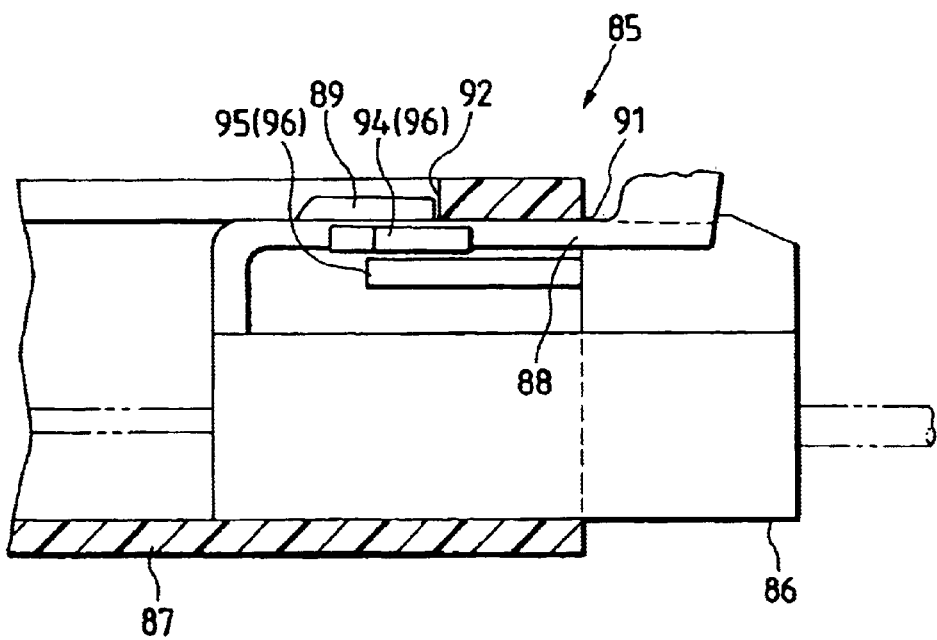
Figure 15B:
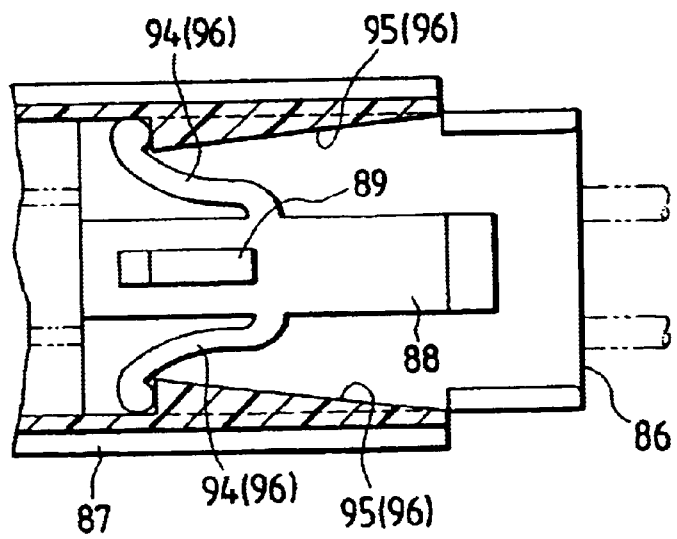
FIG. 15(b) shows a complete condition of the mutual engagement between the male and female connectors.

When the male and female connectors are engaged together completely, that is, when the mutual engagement length between the male and female connectors reaches a preset length, the engaging portion 89 of the flexible arm 88 is engaged with the securing means 92 of the arm guide surface 91 and the flexed condition of the flexible arm 88 is removed. In addition, as shown in FIGS. 14(b) and 15(b), the flexible elastic pieces 94 pass beyond the end of the push-out guide surface 95 and is thereby removed from the push-out guide surface 95 (in FIG. 14(b), the former is removed upwardly from the latter) and, at the same time, the push-out force acting in the connectors mutually removing directions is also removed. Therefore, in the connector complete engagement, the flexible elastic pieces 94 are returned back to their original conditions together with the flexible arm 88, which makes it possible to prevent the possible fatigue of the flexible pieces 94 caused by holding the flexible pieces 94 in the flexed condition for a long period of time. By the way, the push-out force to be generated by the connector removing mechanism 96 provides the same characteristic line as the characteristic line F1 shown in FIG. 5.

As described above, in the connector lock mechanism 85, when the set of male and female connectors 86 and 87 are operated for their mutual engagement, the connector removing mechanism 96 always applies to the male and female connectors 86 and 87 the push-out force which pushes them in their mutually removing directions. Since the push-out force to be generated by the connector removing mechanism 96 is set larger than the mutual contact resistance between the male-type and female-type terminals which are respectively stored within the two connectors, when the two connectors are partially engaged with each other, the two connectors are pushed back in their mutually removing directions at least until the mutually connected condition between the male- and female-type terminals is removed. Therefore, the present connector lock mechanism 85 is surely able to detect the partially engaged condition between the male and female connectors without fail.

Also, the flexible elastic pieces 94 and push-out guide surfaces 95 forming the present connector removing mechanism 96 are respectively provided in their associated connectors in such a manner that they are formed integrally therewith. That is, when compared with the conventional connector removing mechanism which uses separate parts such as compression springs or the like, the present connector removing-mechanism 96 can reduce the number of parts required in the connectors as well as the number of assembling steps thereof, which in turn makes it possible to reduce the manufacturing costs thereof.

Figure 18:
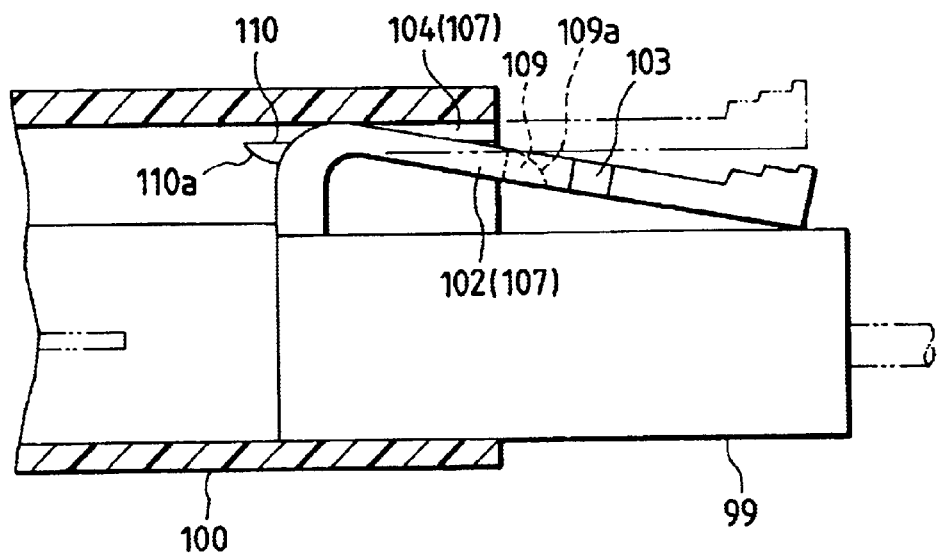
FIG. 18 is a longitudinal section view of the sixth embodiment shown in FIG. 16, showing a partially engaged condition of the mutual engagement between the male and female connectors.
Figure 19:
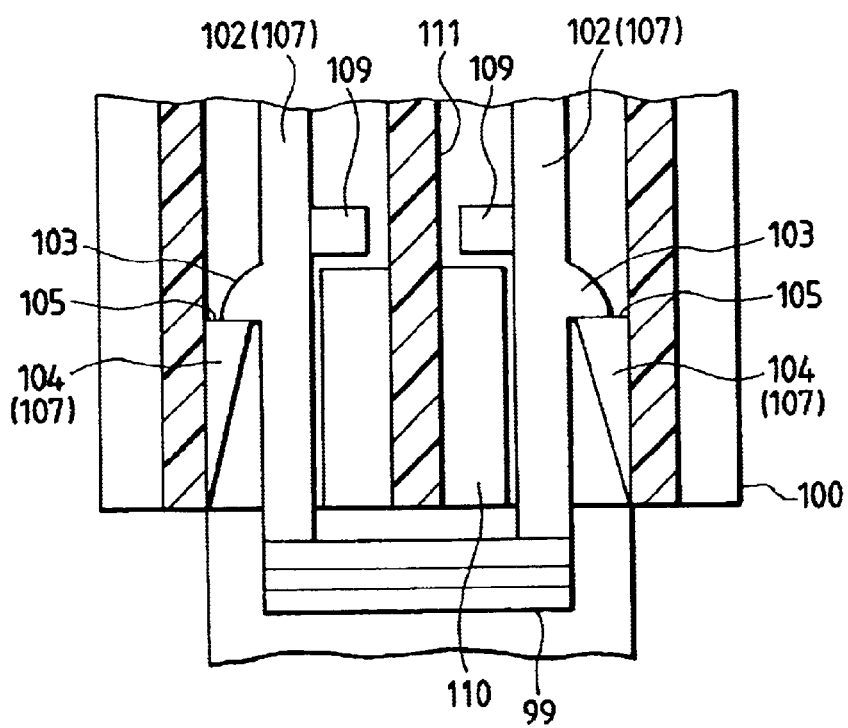
FIG. 19 is a longitudinal section view of the sixth embodiment shown in FIG. 16, showing a completely engaged condition of the mutual engagement between the male and female connectors.

Next, description will be given below in detail of a sixth embodiment of a connector lock mechanism according to the invention with reference to FIGS. 16 to 19. In particular, FIG. 16 is an exploded perspective view of the sixth embodiment of a connector lock mechanism according to the invention, FIG. 17 is a longitudinal section view of male and female connectors respectively shown in FIG. 16, FIG. 18 is a longitudinal section view of the sixth embodiment, showing a mutually partially engaged condition between the male and female connectors shown in FIG. 16, and FIG. 19 is a plan view of the main portions of the sixth embodiment shown in FIG. 16, showing a completely engaged condition between the male and female connectors thereof.

Specifically, a connector lock mechanism 98 according to the present embodiment relates to a set of male and female connectors 99 and 100. In particular, one of the two connectors, namely, the male connector 99 includes a pair of flexible arms 102 and 102 which are respectively formed in such a manner as to extend along a direction thereof (in FIG. 16, in a direction of an arrow E) in which the male connector 99 can be engaged with the other connector, namely, the female connector 100, while each of the flexible arms 102 includes an engaging portion 103 which is formed integrally therewith. Each of the present flexible arms 102 is provided on the housing of the male connector 99 in such a manner that it rises up from the front end side of the male connector 99 housing and then extends toward the rear end side thereof. The free end portions of the two flexible arms 102, which are situated in the rear end side of the male connector housing 99, are connected together to thereby form an operation portion which can be used to remove the locking of the mutual engagement between the male and female connectors.

Also, the engaging portions 103 of the flexible arms 102 are respectively formed in such a manner as to project from the outer surfaces of their associated flexible arms 102 toward the male connector housing side, while the projecting lengths thereof increase gradually from the front end side of the male connector housing toward the rear end side thereof. By the way, the present male connector 99 includes in the width direction thereof two terminal storage chambers 99a which are capable of storing female-type terminals therein.

On the other hand, the other connector, namely, the female connector 100 comprises a pair of arm guide surfaces 104 respectively which are capable of flexing their associated flexible arm 102 until the mutual engagement length between the male and female connectors reaches a preset length. The arm guide surfaces 104 respectively include securing means 105 which, when the connector mutual engagement length reaches the preset length, can secure their associated engaging portions 103 to thereby lock the mutually engaged condition between the two connectors. The present securing means 105 respectively consist of stepped portions which are formed in the rear end portions of their associated arm guide surfaces 104 in such a manner that their associated engaging portions 103 can be engaged with the securing means 105.

As shown in FIG. 19, the two arm guide surfaces 104 are respectively formed on the housing side surfaces of the female connector 100 in such a manner that, when the male and female connectors 99 and 100 are operated for their mutual engagement, the engaging portions 103 of the two flexible arms 102 can be contacted with the arm guide surfaces 104. As the mutual engagement between the male and female connectors advances, the arm guide surfaces 104 gradually flex their respective flexible arms 102 inwardly.

When the engaging portions 103 of the flexible arms 102 are respectively engaged with the securing means 105 of the female connector 100, the flexible arms 102 are returned from their flexed conditions back to their original conditions. If the engaging portions 103 are engaged with securing means 105, then the engaging surfaces thereof prevent the male and female connectors from moving in their mutually removing directions because the engaging surfaces intersect at right angles to the connector engaging direction, so that the mutually engaged condition between the male and female connectors can be locked.

Now, in the connector lock mechanism 98 according to the present embodiment, the pair of flexible arms 102, 102 and the pair of arm guide surfaces 104, 104 cooperate together in forming a connector removing mechanism 107. That is, the present connector removing mechanism 107 is composed of the pair of flexible arms 102, 102 which are formed integrally with the male connector 99 and are used as flexible elastic pieces, and the pair of arm guide surfaces 104, 104 which are formed integrally with the female connector 100 and are used as push-out guide surfaces.

The arm guide surfaces 104 serving as the push-out guide surfaces, when the male and female connectors are engaged with each other, elastically deform their respective flexible arms 102 serving as the flexible elastic pieces to thereby generate a push-out force which acts on the male and female connectors in a direction where they are separated or removed from their mutually engaged condition.

In more detail, the elasticity of the pair of flexible arms 102 and the inclination angles of the pair of arm guide surfaces 104 are set such that the push-out force to be generated by the connector removing mechanism 107 according to the present embodiment is larger than the mutual contact resistance caused by and between male- and female-type terminals respectively stored within the two connectors.

Also, on the respective inner side surfaces of the pair of flexible arms 102 and 102, there are provided wrong operation preventive pieces 109 in such a manner that they are formed integrally with their associated flexible arms 102. As shown in FIGS. 17 and 18, if an operator tries to engage the male and female connectors with each other while the flexible arms 102 are flexed in the locking removed condition, then the wrong operation preventive pieces 109 interfere with an obstacle plates 110 which is disposed within the housing of the female connector 100, thereby preventing the male and female connectors from being engaged with each other. As shown in FIG. 16, the obstacle plate 110 is arranged on the upper wall of the female connector housing in parallel thereto through a support wall 111 which hangs down from the upper wall portion of the housing of the female connector 100.

As shown in FIGS. 17 and 18, the rear end face 110a of the obstacle plate 110 and the rear end faces 109a of the wrong operation preventive pieces 109 are respectively chamfered into smoothly curved shapes. That is, if the two flexible arms 102 and 102 are flexed from their locked conditions shown in FIG. 19 into their locking removed conditions to thereby energize the male and female connectors in their mutually removing directions, then the respective curved surfaces of the wrong operation preventive pieces 109 and obstacle plate 110 are contacted with each other, so that the wrong operation preventive pieces 109 are allowed to slide into below the obstacle plate 110; that is, the movement of the male and female connectors in their mutually removing directions is not prevented by the obstacle plate 110.

As described above, in the connector lock mechanism 98 according to the present embodiment, when the set of male and female connectors 99 and 100 are operated for their mutual engagement, the connector removing mechanism 107 applies to the male and female connectors 99 and 100 the push-out force which pushes them in their mutually removing directions. Since the push-out force to be generated by the connector removing mechanism 107 is set larger than the mutual contact resistance between the male-type and female-type terminals which are respectively stored within the male and female connectors, when the male and female connectors are partially engaged with each other, the male and female connectors are pushed back in their mutually removing directions at least until the mutually connected condition of the male and female terminals is removed. Therefore, the present connector lock mechanism 98 is surely able to detect the partially engaged condition between the male and female connectors without fail.

Also, the flexible arms 102 serving as the flexible elastic pieces and arm guide surfaces 104 serving as the push-out guide surfaces, which respectively cooperate in forming the present connector removing mechanism 107, are respectively provided in their associated connectors in such a manner that they are formed integrally therewith. Therefore, when compared with the conventional connector removing mechanism which uses separate parts such as compression springs or the like, the present connector removing mechanism 107 can reduce the number of parts required in the connectors as well as the number of assembling steps thereof, which in turn makes it possible to reduce the manufacturing costs thereof.

Further, since the wrong operation preventive pieces 109 are formed integrally with their associated flexible arms 102, even if the mutually engaging operation between the male and female connectors is executed in error in a state where the flexible arms 102 are flexed in the locking removed condition, there is surely prevented the possibility that the connector mutually engaging operation can continue in a state where the positions of the flexible elastic pieces are deviated from the positions of the push-out guide surfaces, that is, in a state where the present connector removing mechanism 107 cannot operate normally. This can improve the reliability of the connector removing mechanism 107.

Figure 20:
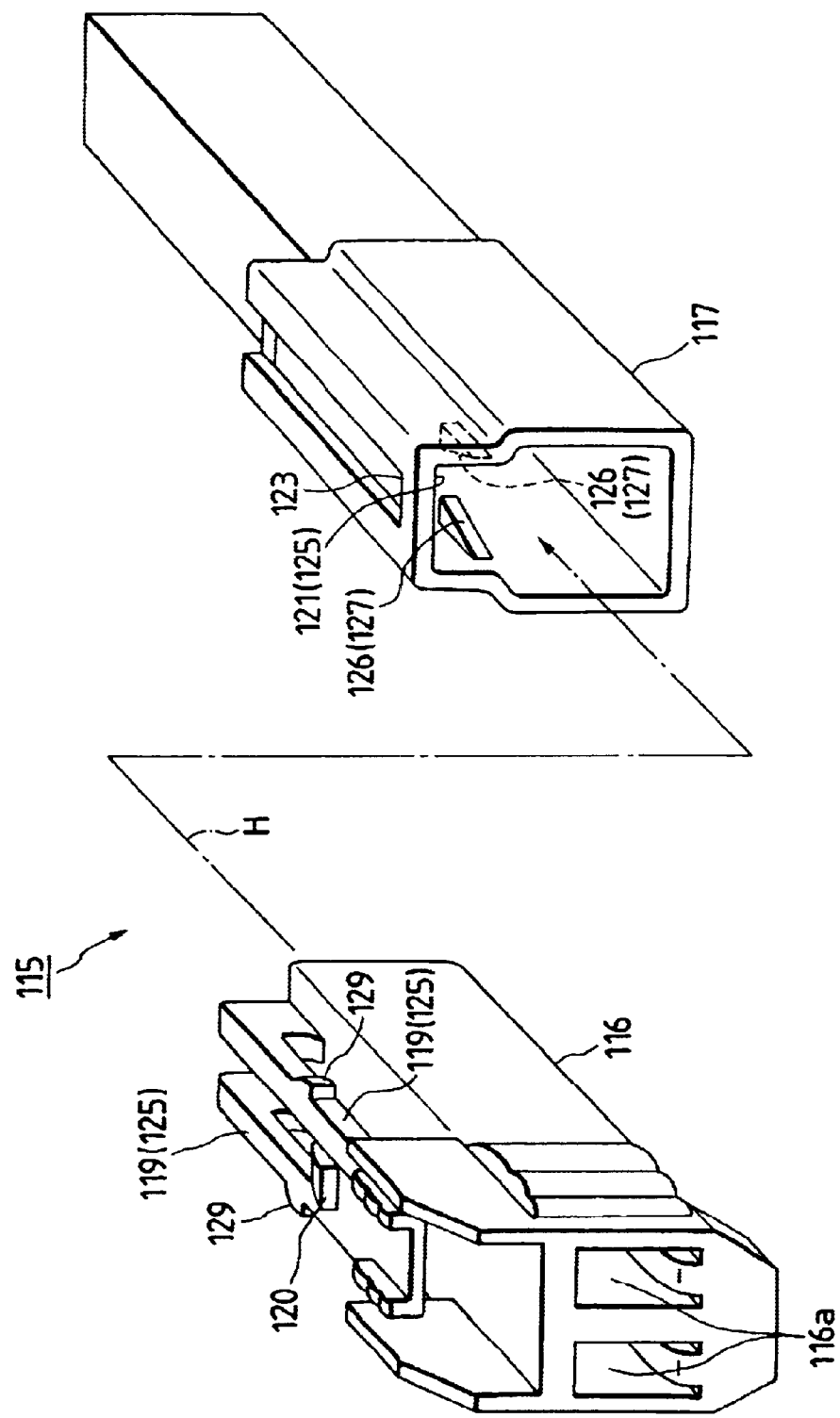
FIG. 20 is an exploded perspective view of a seventh embodiment of a connector lock mechanism according to the invention.
Figure 21:
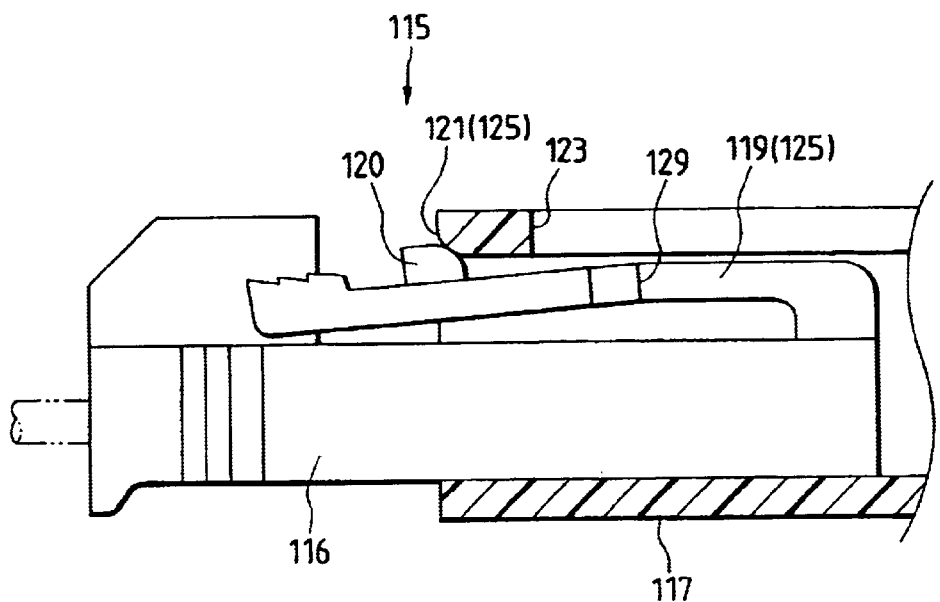
FIG. 21 is a longitudinal section view of the seventh embodiment shown in FIG. 20, showing a partially engaged condition of the mutual engagement between male and female connectors in the seventh embodiment.
Figure 22:
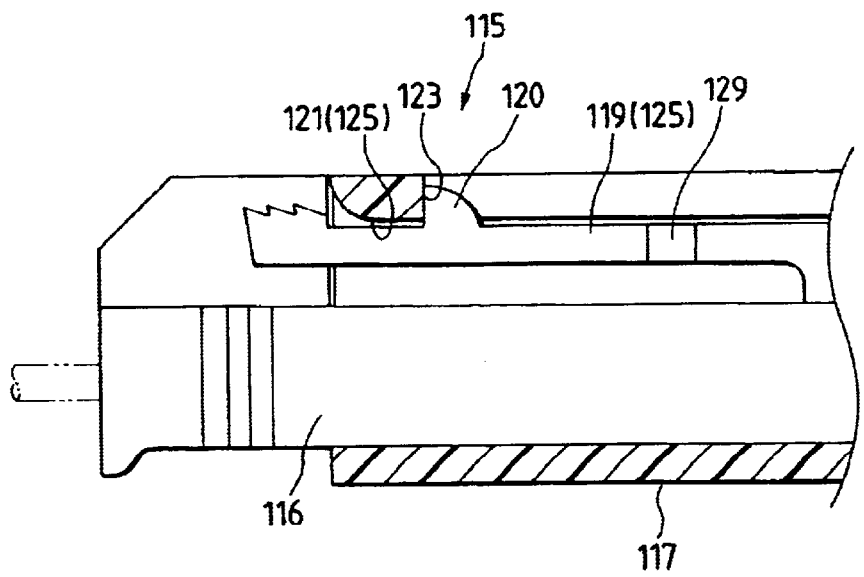
FIG. 22 is a longitudinal section view of the seventh embodiment shown in FIG. 20, showing a completely engaged condition of the mutual engagement between the male and female connectors.
Figure 23:
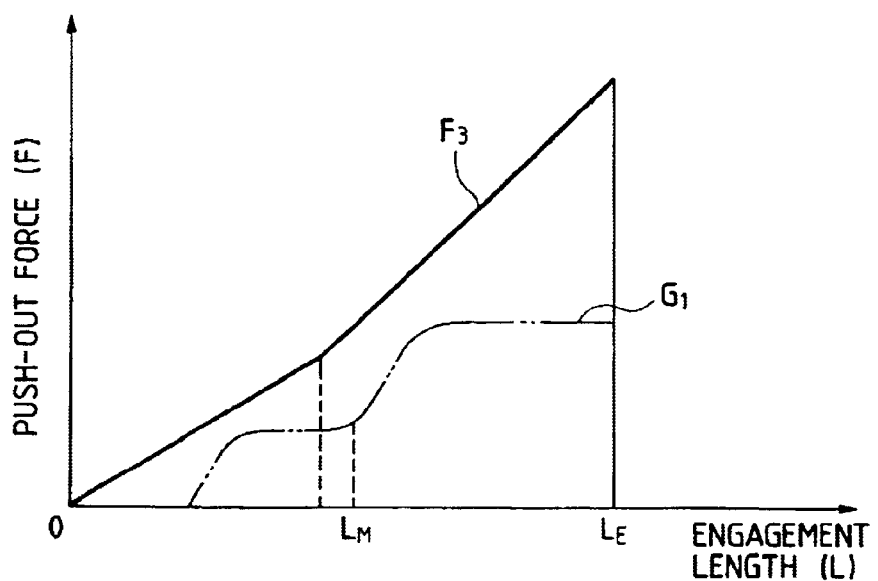
FIG. 23 is an explanatory view of the seventh embodiment shown in FIG. 20, showing the relation between a push-out force and an engagement length in the seventh embodiment.

Next, description will be given below in detail of a seventh embodiment of a connector lock mechanism according to the invention with reference to FIGS. 20 to 23. In particular, FIG. 20 is an exploded perspective view of the seventh embodiment of a connector lock mechanism according to the invention; FIG. 21 is a longitudinal section view of male and female connectors respectively shown in FIG. 20, showing a partially engaged condition between them; FIG. 22 is a longitudinal section view of the male and female connectors shown in FIG. 20, showing a completely engaged condition between them; and FIG. 23 is an explanatory view of the relation between a push-out force to be generated by a connector removing mechanism and the length of the mutual engagement between the male and female connectors in the seventh embodiment shown in FIG. 20.

Specifically, a connector lock mechanism 115 according to the present embodiment relates to a set of male and female connectors 116 and 117. One of the two connectors, namely, the male connector 116 includes a pair of flexible arms 119 and 119 which are respectively formed in such a manner as to extend along a direction thereof (in FIG. 20, in a direction of an arrow H) in which the male connector 116 can be engaged with the other connector, namely, the female connector 117, while the flexible arms 119 include between them an engaging portion 120 which is formed integrally therewith. Each of the flexible arms 119 is provided on the housing of the male connector 116 in such a manner that it rises up from the front end side of the male connector 116 housing and then extends toward the rear end side thereof. The free end portions of the two flexible arms 119 which are situated in the rear end side of the male connector housing are connected together to thereby form an operation portion which can be used to remove the locking of the mutual engagement between the male and female connectors. The engaging portion 120 of the flexible arms 119 is formed in such a manner as to project from the outer surfaces of the flexible arms 119 toward the male connector housing side, while the upwardly projecting length thereof increases gradually from the front end side of the male connector housing toward the rear end side thereof. It is noted that the present male connector 116 includes in the width or lateral direction thereof two terminal storage chambers 116a which are capable of storing female-type terminals therein.

On the other hand, the other connector, namely, the female connector 117 comprises an arm guide surface 121 which is capable of flexing the flexible arms 119 until the mutual engagement length between the male and female connectors reaches a preset length, while the arm guide surface 121 includes securing means 105 which, when the connector mutual engagement length reaches the preset length, is capable of securing the engaging portion 120 of the flexible arms 119 to thereby lock the mutually engaged condition between the male and female connectors.

As shown in FIG. 21, the arm guide surface 121 is formed on the side surface of the housing of the female connector 117 in such a manner that, when the male and female connectors 116 and 117 are operated for their mutual engagement, the engaging portion 120 of the flexible arms 119 contact the arm guide surface 121. In particular, the arm guide surface 121 is able to flex the flexible arms 119 gradually downwardly as the mutual engagement between the male and female connectors advances. The securing means 123 consists of a rectangular-shaped securing hole which is formed in the rear end portion of the arm guide surface 121 in such a manner that the engaging portion 120 can be engaged with the securing means 123. The female connector 117 stores and holds therein two male-type terminals which correspond to the female-type terminals stored within the male connector 116.

As shown in FIG. 22, when the engaging portion 120 of the flexible arms 119 is engaged with the securing means 123 of the female connector 117, the flexible arms 119 are returned from their flexed conditions back to their original conditions. At this time, since the engaging surfaces thereof extend at right angles to the engaging direction of the male and female connectors, they prevent the male and female connectors from moving in their mutually removing directions, so that the mutually engaged condition between the male and female connectors can be locked.

In the connector lock mechanism 115 according to the present embodiment, not only the pair of flexible arms 119 including the engaging portion 120 between them and the pair of arm guide surface 121 function as a first connector removing mechanism 125, but also the pair of flexible arms 119 and a pair of push-out guide surfaces 126 and 126 respectively formed in the two inner surfaces of the female connector 117 function as a second connector removing mechanism 127.

That is, the first connector removing mechanism 125 is composed of the pair of flexible arms 119, 119 formed integrally with the male connector 116 and serving as flexible elastic pieces, and the pair of arm guide surfaces 121 formed integrally with the female connector 117 and serving as push-out guide surfaces. The arm guide surfaces 121 functioning as the push-out guide surfaces, when the male and female connector are operated for their mutual engagement, can deform elastically the flexible arms 119 serving as the flexible elastic pieces downwardly through the engaging portion 120 thereof to thereby generate a push-out force which removes the mutually engaged condition between the male and female connectors.

Also, the second connector removing mechanism 127 is structured such that, when the male and female connector are operated for their mutual engagement, two push-out projections 129 respectively provided on the respective outer side surfaces of the two flexible arms 119 are contacted with their associated push-out guide surfaces 126 to thereby elastically deform the flexible arms 119 inwardly. The elastic deformation of the flexible arms 119 generates the push-out force which removes the mutually engaged condition between the male and female connectors. Therefore, the total of the push-out force to be generated by the first connector removing mechanism 125 and the push-out force to be generated by the second connector removing mechanism 127 provides the actually obtainable push-out force.

In the connector removing mechanisms 125 and 127 according to the present embodiment, the elasticity of the pair of flexible arms 119, 119 when they are flexed and the inclination angles of the arm guide surfaces 121 and push-out guide surfaces 126 are set in such a manner that the total of the push-out force to be generated by the first connector removing mechanism 125 and the push-out force to be generated by the second connector removing mechanism 127 is larger than the mutual contact resistance caused by and between male- and female-type terminals respectively held within their associated connectors.

As described above, in the connector lock mechanism 115 according to the present embodiment, when the set of male and female connectors 116 and 117 are operated for their mutual engagement, the first and second connector removing mechanism 125 and 127 apply to the male and female connectors 116 and 117 the push-out force which pushes them in their mutually removing directions. Since the push-out force to be generated by the connector removing mechanisms 125 and 127 is set larger than the mutual contact resistance caused by and between the male-type and female-type terminals which are respectively stored within the two connectors, if the male and female connectors are partially engaged together, then the male and female connectors are pushed back in their mutually removing directions at least until the mutually connected condition of the male and female terminals is removed.

Therefore, the present connector lock mechanism 115 is surely able to detect the partially engaged condition between the male and female connectors without fail.

Also, the flexible elastic pieces and push-out guide surfaces, which respectively cooperate in forming the present connector removing mechanisms 125 and 127, are respectively provided in their associated connectors in such a manner that they are formed integrally therewith. Therefore, when compared with the conventional connector removing mechanism which uses separate parts such as compression springs or the like, the present connector removing mechanism 125 and 127 can reduce the number of parts required in the connectors as well as the number of assembling steps thereof, which in turn makes it possible to reduce the manufacturing costs thereof.

Further, since the flexible elastic pieces and push-out guide surfaces respectively cooperating in forming the present connector removing mechanisms are provided in two or more sets, for example, if the respective sets of flexible elastic pieces and push-out guide surfaces are shifted in the operation timings from one another, the push-out force to be generated by the present connector removing mechanisms can be made to vary. Also, if the two or more sets of flexible elastic pieces and push-out guide surfaces are operated simultaneously, then a large push-out force can be obtained easily and, therefore, even if the number of terminals to be stored within the respective connectors is large, the present connector removing mechanisms are surely able to provide a necessary and sufficient push-out force.

It is noted that the push-out force that can be obtained when the operation timings of the first and second connector removing mechanism 125 and 127 are shifted from each other provides such a characteristic line F3 as shown in FIG. 23.

Figure 24:
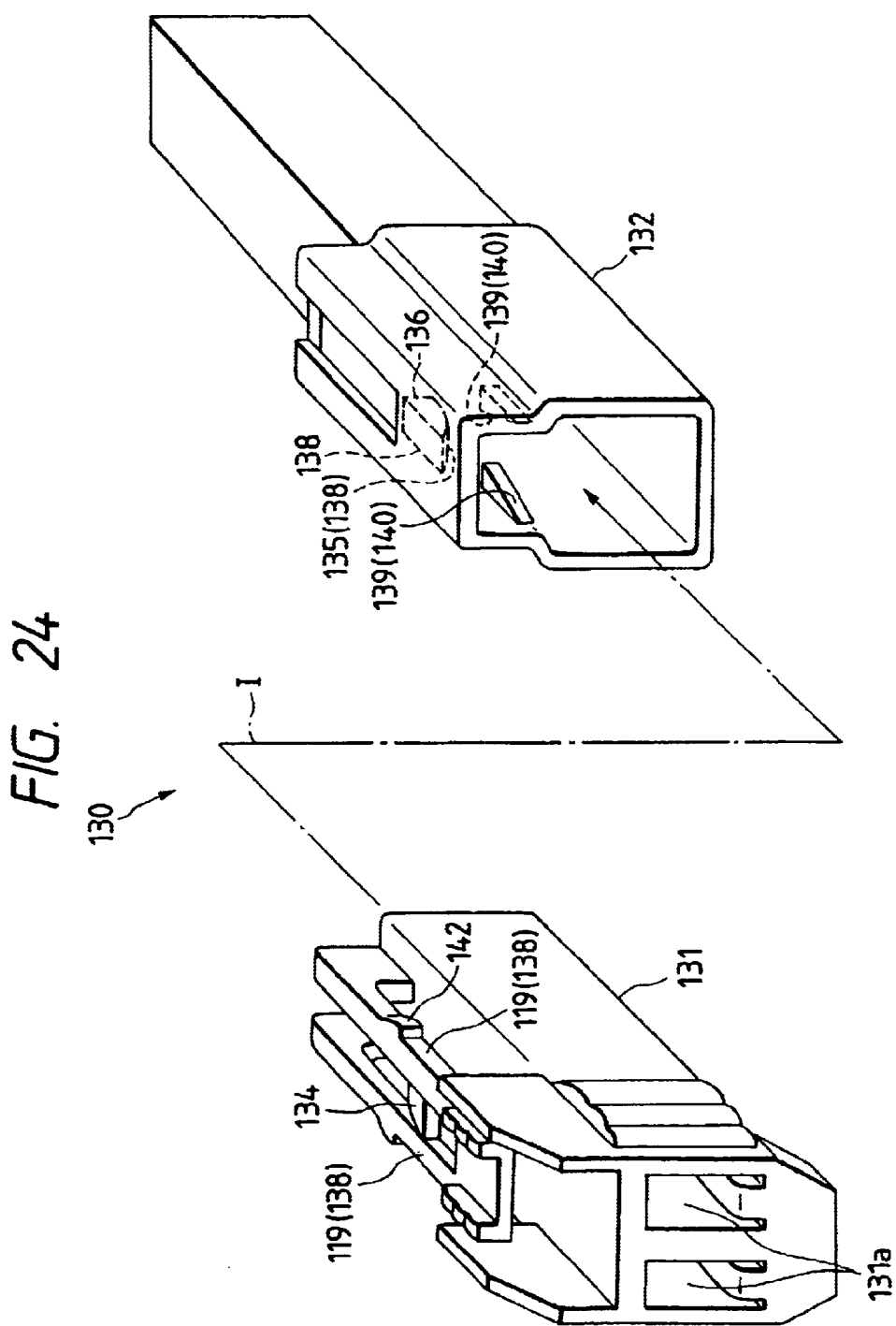
FIG. 24 is an exploded perspective view of an eighth embodiment of a connector lock mechanism according to the invention.
Figure 25:
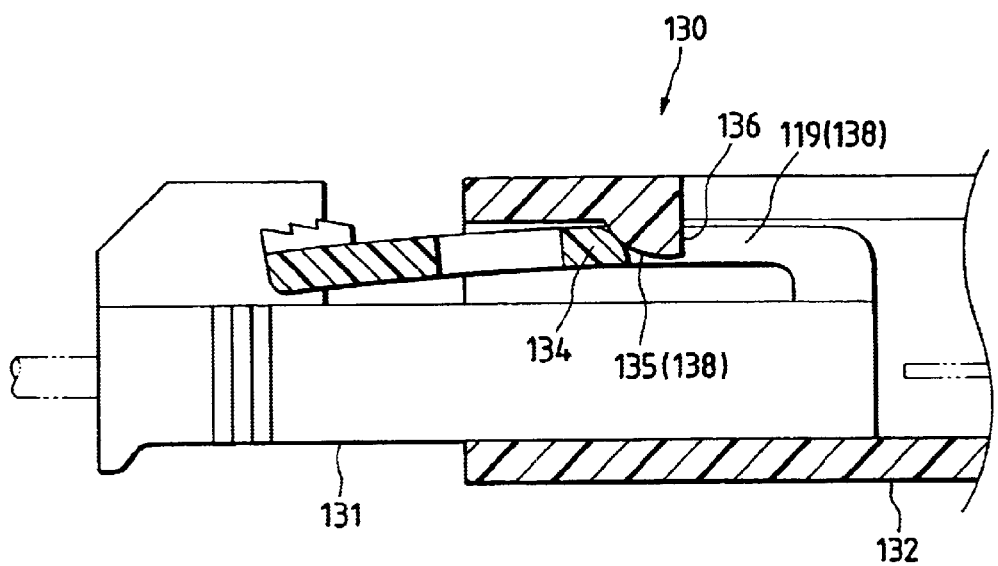
FIG. 25 is a longitudinal section view of the eighth embodiment shown in FIG. 24, showing an intermediate condition of mutual engagement between male and female connectors in the eighth embodiment.
Figure 26:
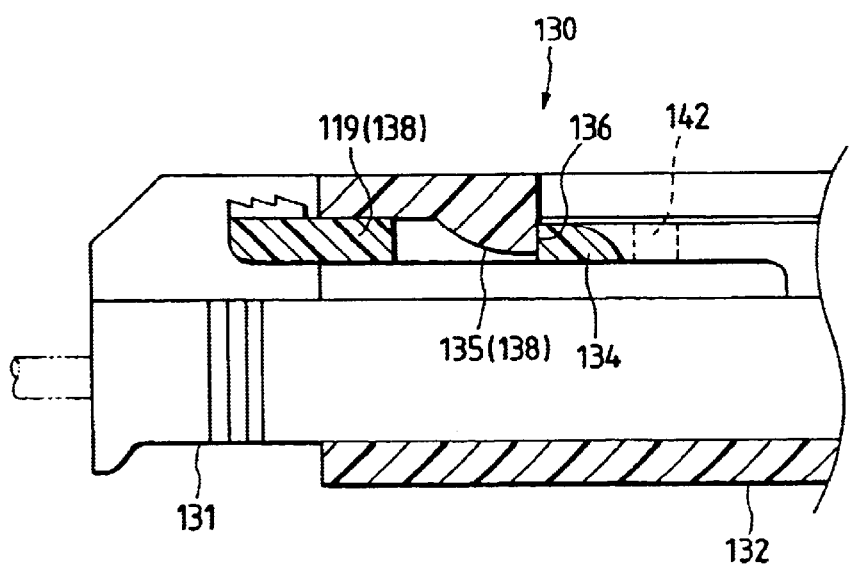
FIG. 26 is a longitudinal section view of the eighth embodiment shown in FIG. 24, showing a completely engaged condition of the mutual engagement between the male and female connectors.
Figure 27:
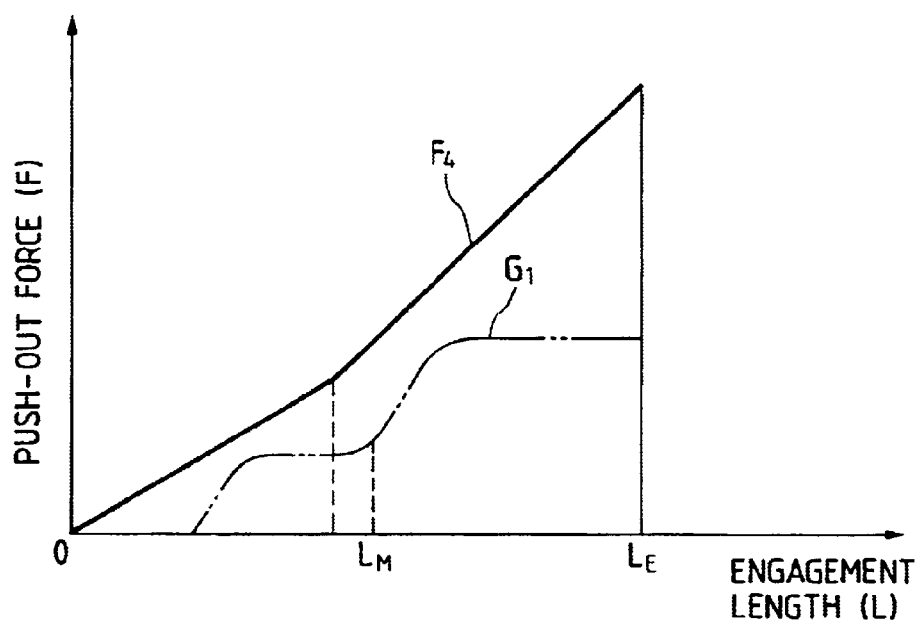
FIG. 27 is an explanatory view of the eighth embodiment shown in FIG. 24, showing the relation between a push-out force and an engagement length in the eighth embodiment.
Figure 28:
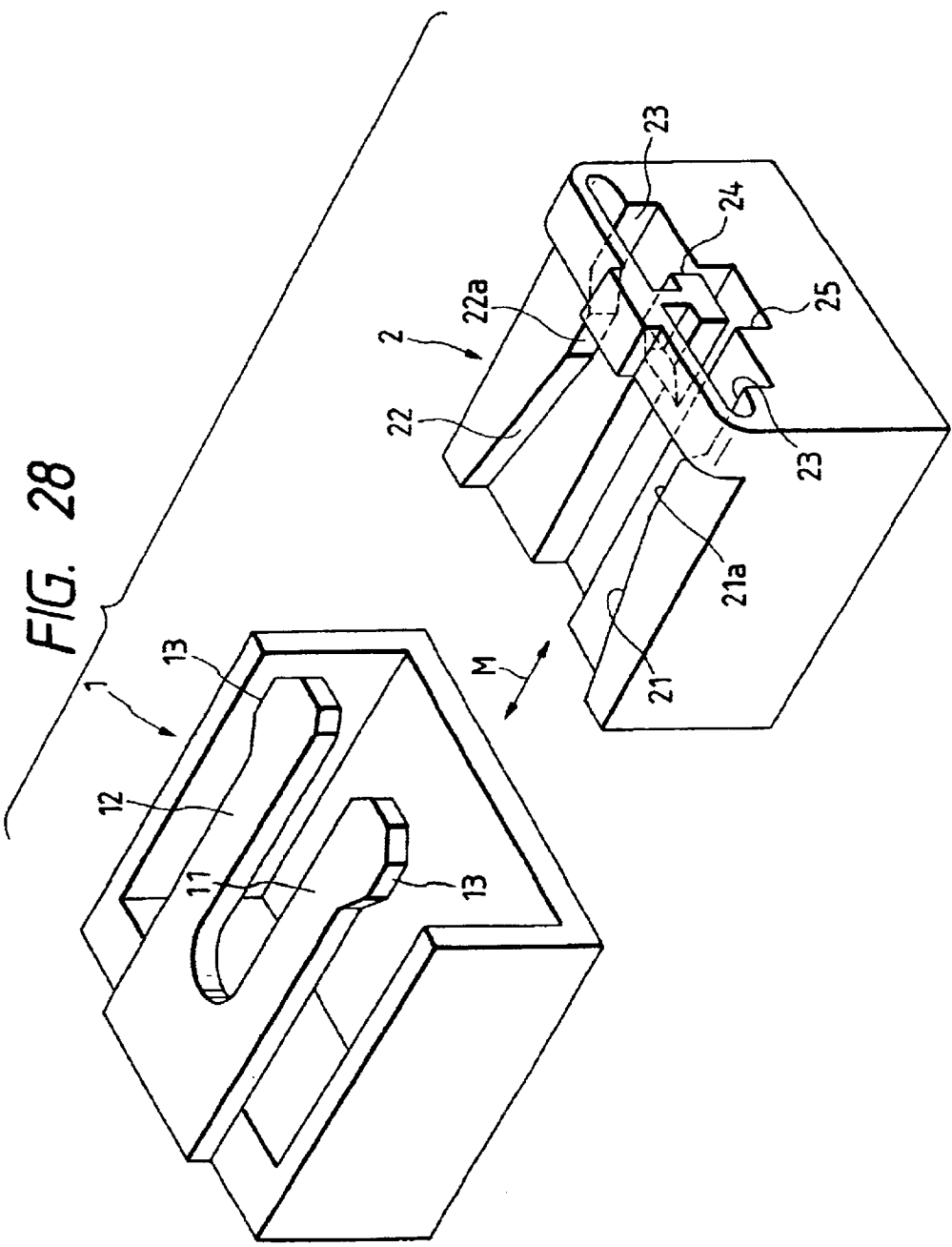
FIG. 28 is a perspective view of male and female connectors, showing a conventional connector lock mechanism; and, FIG. 29 is a perspective view of the conventional connector lock mechanism shown in FIG. 28, showing a partially engaged condition of mutual engagement between male and female connectors in the conventional connector lock mechanism.
Figure 29:
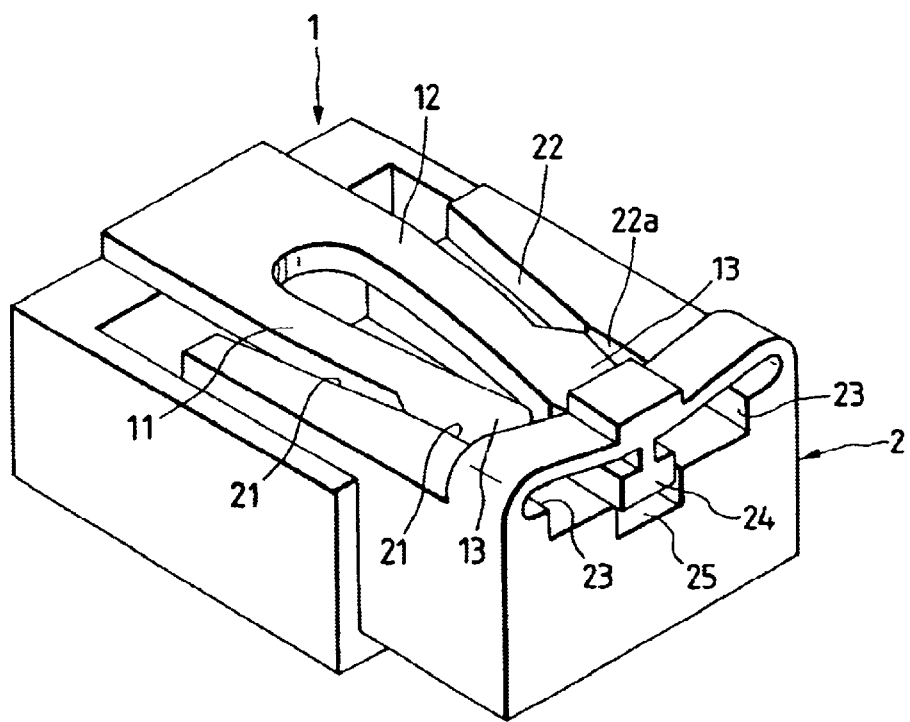

Next, description will be given below in detail of an eighth embodiment of a connector lock mechanism according to the invention with reference to FIGS. 24 to 27. In particular, FIG. 24 is an exploded perspective view of the eighth embodiment of a connector lock mechanism according to the invention; FIG. 25 is a longitudinal section view of male and female connectors respectively shown in FIG. 24, showing a partially engaged condition between them; FIG. 26 is a longitudinal section view of the male and female connectors shown in FIG. 24, showing a completely engaged condition between them; and FIG. 27 is an explanatory view of the relation between a push-out force to be generated by a connector removing mechanism shown in FIG. 24 and the length of the mutual engagement between the male and female connectors.

Specifically, a connector lock mechanism 130 according to the present embodiment comprises a set of male and female connectors 131 and 132. One of the two connectors, namely, the male connector 131 includes a pair of flexible arms 119 and 119 which are respectively formed in such a manner as to extend along a direction thereof (in FIG. 24, in a direction of an arrow I) in which the male connector 131 can be engaged with the other connector, namely, the female connector 132, while the two flexible arms 119 include an engaging portion 134 formed integrally therewith. Each of the flexible arm 119 is provided on the housing of the male connector 131 in such a manner that it rises up from the front end side of the male connector 131 housing and then extends toward the rear end side thereof. The respective free end portions of the two flexible arms 119 which are situated in the rear end side of the male connector housing are connected together to thereby form an operation portion which can be used to remove the locking of the mutual engagement between the male and female connectors.

Also, the engaging portion 134 is interposed between the flexible arms 119 and, as shown in FIGS. 25 and 26, is formed in a curved surface in which the upwardly projecting length thereof increases gradually from the front end side of the housing of the male connector 131 toward the rear end side thereof. The present male connector 131 includes in the width direction thereof two terminal storage chambers 131a which are capable of storing female-type terminals therein.

On the other hand, the other connector, namely, the female connector 132 comprises an arm guide surface 135 which is capable of flexing the flexible arms 119 until the mutual engagement length between the male and female connectors reaches a preset length. The arm guide surface 135 includes securing means 136 which, when the connector mutual engagement length reaches the preset length, can secure the engaging portion 134 of the flexible arms 119 to thereby lock the mutually engaged condition between the male and female connectors 131 and 132.

As shown in FIG. 25, the arm guide surface 135 is formed on the side surface of the housing of the female connector 132 in such a manner that, when the male and female connectors 131 and 132 are operated for their mutual engagement, the engaging portion 134 of the flexible arms 119 contact the arm guide surface 135. In particular, the arm guide surface 135 is structured such that it can flex the flexible arms 119 gradually downwardly as the mutual engagement between the male and female connectors advances. Also, the securing means 136 consists of a stepped portion which is formed in the rear end portion of the arm guide surface 135 in such a manner that the engaging portion 134 can be engaged with the securing means 136. It is noted that the female connector 132 stores and holds therein two male-type terminals which correspond to the female-type terminals stored within the male connector 131.

As shown in FIG. 26, when the engaging portion 134 of the flexible arms 119 is engaged with the securing means 136 of the female connector 132, the flexible arms 119 are returned from the flexed conditions back to their respective original conditions. At this time, because the engaging surfaces thereof extend at right angles to the connector mutually engaging direction, the mutually engaged condition between the male and female connectors can be locked positively.

Also, in the connector lock mechanism 130 according to the present embodiment, not only the pair of flexible arms 119, 119 and the arm guide surface 135 function as a first connector removing mechanism 125, but also the pair of flexible arms 119, 119 and a pair of push-out guide surfaces 139, 139 respectively formed in the two inner surfaces of the female connector 132 function as a second connector removing mechanism 140.

That is, the first connector removing mechanism 138 is composed of the pair of flexible arms 119, 119 formed integrally with the male connector 131 and serving as flexible elastic pieces, and the arm guide surface 135 formed integrally with the female connector 132 and serving as a push-out guide surface. And, the arm guide surface 135 functioning as the push-out guide surface, when the male and female connector are operated for their mutual engagement, elastically deforms the flexible arms 119 serving as the flexible elastic pieces downwardly through the engaging portion 134 thereof to thereby generate a push-out force which removes the mutually engaged condition between the male and female connectors.

Also, the second connector removing mechanism 140 is structured such that, when the male and female connector are operated for their mutual engagement, the push-out guide surfaces 139 are allowed to press against two push-out projections 142, which are respectively provided on and projected from the respective outer side surfaces of the two flexible arms 119, inwardly to thereby elastically deform the flexible arms 119 inwardly. The elastic deformation of the flexible arms 119 can generate the push-out force which removes the mutually engaged condition between the male and female connectors 131 and 132.

Therefore, the total of the push-out force to be generated by the first connector removing mechanism 138 and the push-out force to be generated by the second connector removing mechanism 140 provides the actually obtainable push-out force.

Also, in the connector removing mechanisms 138 and 140 according to the present embodiment, the elasticity of the pair of flexible arms 119, 119 when they are flexed and the inclination angles of the arm guide surface 135 and push-out guide surfaces 139 are set in such a manner that the total of the push-out force to be generated by the first connector removing mechanism 138 and the push-out force to be generated by the second connector removing mechanism 140 is larger than the mutual contact resistance caused by and between the male- and female-type terminals respectively held within their associated connectors.

As described above, in the connector lock mechanism 130 according to the present embodiment, when the set of male and female connectors 131 and 132 are operated for their mutual engagement, the first and second connector removing mechanisms 138 and 140 apply to the male and female connectors 131 and 132 the push-out force which pushes them in their mutually removing directions. Since the push-out force to be generated by the connector removing mechanisms 138 and 140 is set larger than the mutual contact resistance between the male- and female-type terminals which are respectively stored within their associated connectors, if the male and female connectors are partially engaged together, then the male and female connectors 131 and 132 are pushed back in their mutually removing directions at least until the mutually connected condition of the male- and female-type terminals is removed. Therefore, the present connector lock mechanism 130 is surely able to detect the partially engaged condition between the male and female connectors 131 and 132 without fail.

Also, the flexible elastic pieces and push-out guide surfaces, which respectively cooperate in forming the present connector removing mechanisms 138 and 140, are respectively provided in their associated connectors in such a manner that they are formed integrally therewith. Thanks to this, when compared with the conventional connector removing mechanism which uses separate parts such as compression springs or the like, the present connector removing mechanisms 138 and 140 can reduce the number of parts required in the connectors as well as the number of assembling steps thereof, which in turn makes it possible to reduce the manufacturing costs thereof.

It is noted that the push-out force that can be obtained when the operation timings of the first and second connector removing mechanism 138 and 140 are shifted from each other provides such a characteristic line F4 as shown in FIG. 27.

As has been described heretofore, according to the invention, there is provided a connector lock mechanism which comprises a connector removing mechanism. The present connector removing mechanism is composed of a flexible elastic piece formed integrally with one connector, and a push-out guide surface which is formed integrally with the other connector and also which, when the two connectors are operated for their mutual engagement, can deform the flexible elastic piece elastically to thereby generate a push-out force that separates the two connectors from each other in their mutually removing directions. And, the elasticity of the flexible elastic piece and the inclination angle of the push-out guide surface are set in such a manner that the push-out force to be generated by the present connector removing mechanism is larger than the mutual contact resistance caused by and between male- and female-type terminals which are respectively held within their associated connectors.

Therefore, not only because, when a set of male and female connectors are operated for their mutual engagement, the present connector removing mechanism applies to the male and female connectors the push-out force which acts on the male and female connectors in directions where they are separated from each other, but also because the push-out force to be generated by the present connector removing mechanism is set larger than the mutual contact resistance caused by and between male- and female-type terminals within their associated connectors, if the male and female connectors are partially engaged, then the male and female connectors are pushed back in their mutually separating or removing directions at least until the connected condition between the male- and female-type terminals is removed. This makes it possible to surely detect the partially engaged condition between the male and female connectors without fail.

Also, since the flexible piece and push-out guide surface cooperating together in forming the present connector removing mechanism are respectively formed integrally with their associated connectors, when compared with the conventional connector removing mechanism which uses separate parts such as compression springs, the present connector removing mechanism can reduce the number of parts required in the connectors as well as the number of assembling steps thereof, which in turn makes it possible to reduce the manufacturing costs thereof.

Also, in the above-mentioned connector lock mechanism, preferably, the flexible arm may also serve as the flexible elastic piece and the arm guide surface may also serve as the push-out guide surface. That is, in the present preferred embodiment, the respective connectors can be simplified in structure, which in turn can enhance the moldability of the connectors as well as the yield of the products.

Further, in the above-mentioned connector lock mechanism, preferably, within the range of the above-mentioned mutual engagement between the male and female connectors, the inclination angle of the push-out guide surface may be changed properly in the intermediate portion thereof in such a manner that a greater push-out force can be generated in the range of the mutual connection between the above-mentioned male- and female-type terminals than in the unconnected condition between the male- and female-type terminals. That is, in the thus structured preferred embodiment, in the unconnected condition between the male- and female-type terminals in which the mutual resistance between the male- and female-type terminals does not act, the push-out force to be generated by the connector removing mechanism can be controlled to a minimum, which makes it possible to save an operation force necessary for mutual engagement between the male and female connectors. Therefore, the operation for mutual engagement between the male and female connectors can be improved in efficiency.

Still further, in the above-mentioned connector lock mechanism, preferably, the flexible elastic piece may be formed integrally with the flexible arm, and a wrong operation preventive piece, which is used to prevent the male and female connectors from being engaged with each other while the flexible arm is flexed in its locking removed condition, may be formed integrally with the flexible arm. That is, in the present preferred embodiment, even if the mutual engagement between the male and female connectors is executed in error while the flexible arm is flexed in its locking removed condition, the connector removing mechanism is prevented from operating normally in a condition where the position of the flexible elastic piece is shifted from the position of the push-out guide surface. Therefore, the mutual engagement between the male and female connectors due to the inadvertent flexing of the flexible arm can be prevented, thereby being able to enhance the reliability of the connector removing mechanism.

Yet further, in the above-mentioned connector lock mechanism, preferably, the above-mentioned flexible elastic piece and push-out guide surface may be provided in two or more sets. That is, in the present preferred embodiment, if the operation timings of the respective sets of flexible elastic pieces and push-out guide surfaces are shifted from one another, then the push-out force to be generated by the connector removing mechanism can be made to vary.

Also, if the two or more sets of flexible elastic pieces and push-out guide surfaces are operated simultaneously, then a large push-out force can be provided easily. Therefore, even if the number of terminals to be stored within the respective connectors is large, there can be obtained a necessary and sufficient push-out force.

Moreover, in the above-mentioned connector lock mechanism, preferably, while the flexible arm is held in its flexed condition, a push-out force acting on the male and female connectors in their mutually removing directions may be always generated due to the flexed condition of the flexible elastic piece; and, if the male and female connectors are engaged with each other completely, then the flexed conditions of the flexible arm and flexible elastic piece may be removed, thereby being able to remove the push-out force acting on the male and female connectors in their mutually removing directions. Therefore, when the male and female connectors are completely engaged with each other, the flexible elastic piece, together with the flexible arm, can be returned to its original condition, which makes it possible to prevent the fatigue of the flexible elastic piece caused by the long flexed condition thereof.

What is claimed is:

1. A connector lock mechanism for locking the connected condition of a set of male and female connectors to be engaged with each other, the connector lock mechanism comprising:

a flexible arm disposed on one of the male and female connectors and extending in a cantilevered manner along a direction in which one of the male and female connectors can be engaged with the other one of the male and female connectors, said arm including a base end which is directly connected to the one of the male and female connectors;

an engaging portion disposed on the flexible arm;

an arm guide surface disposed on the other connector one of the male and female connectors for flexing the flexible arm until a connector mutual engagement length between the two connectors reaches a preset length;

a securing member disposed on the other connector, said securing member securing the engaging portion of the flexible arm to thereby prevent the two connectors from being removed from each other when the connector mutual engagement length reaches the preset length; and a connector removing mechanism including said flexible arm, and a push-out guide surface which is formed integrally with said other connector and also which, when said two connectors are operated for their mutual engagement, deforms said flexible arm elastically to thereby generate a push-out force separating said two connectors from each other in mutually removing directions, wherein the elasticity of said flexible arm and an inclination angle of said push-out guide surface are set such that said push-out force generated by said connector removing mechanism is greater than contact resistance caused by mutual connection between male- and female-type terminals respectively held within their associated connectors.

2. The connector lock mechanism of claim 1, wherein said arm guide surface serves as said push-out guide surface.

3. The connector lock mechanism of claim 1, wherein, in the range of the mutual engagement between said two connectors, the angle of said push-out guide surface is changed in the intermediate portion thereof so that a greater push-out force can be generated in the mutually connected range of said male- and female-type terminals than in the mutually unconnected range of said male- and female-type terminals.

4. The connector lock mechanism of claim 1, wherein said connector lock mechanism includes two of said flexible arms and said push-out guide surfaces, respectively.

5. The connector lock mechanism of claim 1, wherein, while said flexible arm is held in a flexed condition, the flexed condition of said flexible arm generates said push-out force acting said two connectors in their mutually removing directions and, if said two connectors are completely engaged with each other, the flexed condition of said flexible arm is removed, thereby removing said push-out force acting in said connectors mutually removing directions.

* * * * *